United States Patent [19]
Champagne et al.

[11] Patent Number: 5,587,786
[45] Date of Patent: Dec. 24, 1996

[54] APPARATUS FOR MEASURING A BEAM WIDTH $D_{\sigma x}$ ALONG A TRANSVERSE DIRECTION OF A LASER BEAM AND METHOD THEREOF

[75] Inventors: Yves Champagne, Sainte-Foy; Claude Paré, Saint-Augustin-de-Desmaures; Pierre-André Bélanger, Sainte-Foy, all of Canada

[73] Assignee: Université Laval, Québec, Canada

[21] Appl. No.: 393,572

[22] Filed: Feb. 23, 1995

[51] Int. Cl.$^6$ .................................................. G01J 1/00
[52] U.S. Cl. .................................................. 356/121
[58] Field of Search .................................. 356/121, 225

[56] References Cited

U.S. PATENT DOCUMENTS

| | | | |
|---|---|---|---|
| 3,809,478 | 5/1974 | Talbot | 356/71 |
| 4,874,939 | 10/1989 | Nishimoto et al. | 250/211 |

FOREIGN PATENT DOCUMENTS

| | | | |
|---|---|---|---|
| 56-46433 | 4/1981 | Japan | 356/121 |
| 56-70429 | 6/1981 | Japan | 356/121 |
| 58-139032 | 8/1983 | Japan | 356/121 |
| 63-16232 | 1/1988 | Japan | 356/121 |
| 63-142222 | 6/1988 | Japan | 356/121 |
| 1-124717 | 5/1989 | Japan | 356/121 |

OTHER PUBLICATIONS

Fleischer et al., "Gaussian Beam Profiling: How and Why", Laser & Optronics, May 1987, pp. 61–64.

Stafford, "Measuring Diameter of a Laser Beam", IBM Technical Disclosure Bulletin, vol. 17, No. 11, Apr. 1975, pp. 3197–3198.

*Primary Examiner*—F. L. Evans
*Attorney, Agent, or Firm*—Darby & Darby, P.C.

[57] ABSTRACT

The present invention relates to an apparatus and a method upon which the apparatus is based for direct optical measurement of first and second moments (variance) of two-dimensional continuous-wave optical beam irradiance distributions. The apparatus and method are based on an optical filter having a spatially-varying transmittance or reflectance profile described by a one-dimensional truncated parabolic function. The light power transmitted through or reflected by the optical filter is measured by a photodetector as the optical filter travels horizontally across the beam irradiance profile. The variance is obtained from the ratio of the peak signal given by the photodetector normalized to the signal corresponding to the total optical power of the unobstructed optical beam. The first moment in a fixed reference frame is given by the horizontal position of the region of peak transmittance/reflectance of the filter when the maximum signal is measured.

19 Claims, 7 Drawing Sheets

APPARATUS FOR MEASURING A BEAM WIDTH $D_{\sigma x}$ ALONG A TRANSVERSE DIRECTION OF A LASER BEAM AND METHOD THEREOF

BACKGROUND OF THE INVENTION a) Field of the Invention

The present invention is concerned with an apparatus for measuring a beam width $D_{\sigma x}$ along a transverse direction of a laser beam. The present invention is also concerned with a method for measuring a beam width $D_{\sigma x}$ along a transverse direction of a laser beam.

b) Brief Description of the Related Art

Known in the art is U.S. Pat. No. 4,874,939 (Nishimoto et al.), which describes a method and an apparatus for detecting position/variance of input light using linear and quadratic outputs. The apparatus for detecting position/variance of input light includes a photoelectric conversion device receiving input light. The photoelectric conversion device is constituted of a first resistive layer formed of a first photoelectric conversion material and a second resistive layer formed of a second photoelectric conversion material connected with the first resistive layer through a depletion layer or directly. The first resistive layer is provided with uniform resistivity throughout its surface so that a linear output proportional to the average of the distances between one end of the photoelectric conversion device and positions of the input light is detected, and the second resistive layer is provided with resistivity dependent upon the distance from its one end so that a quadratic output proportional to the average of the squares of the distances between one end of the photoelectric conversion device and positions of the input light is detected.

Also known in the art is U.S. Pat. No. 3,809,478 (Talbot), which describes a diffractometer for analyzing the geometrical characteristics of the components of a system. In such a diffractometer the received diffraction pattern is filtered in accordance with a mathematical equation to yield a spatial period spectrum of a moment, excluding the zeroth moment, of that spectrum. The filtering may be effected by means of suitable optical filters for viewing on a screen or for electronic detection, or electronically in the detector circuits.

None of the above described patent shows or describes the necessary means for measuring a beam width $D_{\sigma x}$ along a transverse direction of a laser beam in a simple manner.

SUMMARY OF THE INVENTION

It is an object of the present invention to provide a method and an apparatus for easily measuring a beam width $D_{\sigma x}$ along a transverse direction of a laser beam.

According to the present invention, the above object is achieved with an apparatus for measuring a beam width $D_{\sigma x}$ along a transverse direction of a laser beam having a full power $P_0$ and a given optical irradiance distribution. The apparatus comprises:

a first optical filter having a transmittance or reflectance profile M(x) varying along a transverse direction X and characterized by lines of constant transmittance or reflectance along a transverse direction Y which is perpendicular to the direction X, the profile M(x) varying along the direction X according to a one-dimensional inverted parabola with a central maximum $M_{max}$ and two peripheral minima $M_{min}$ separated by a distance $W_F$ where a part of the laser beam falling outside the peripheral minima $M_{min}$ of the inverted parabola is substantially blocked, the profile M(x) being defined by the following equation:

$$M(x) = M_{max} - \frac{4(M_{max} - M_{min})}{W_F^2} (x - x_c)^2$$

where $M_{min}$, $M_{max}$ and $W_F$ are predetermined constants and $x_c$ is the value of x at a central position along the distance $W_F$, $W_F$ being wide enough so that a part of the laser beam which spills past boundaries determined by minima $M_{min}$ is negligible when the profile M(x) is centered on the optical irradiance distribution of the laser beam;

scanning means having a scanning axis for scanning the transverse direction X of the first optical filter with the laser beam;

an optical detector for detecting a light signal modified by the first optical filter, and producing a first output signal accordingly;

signal processing and detecting means for processing the output signal of the optical detector to determine a maximum power value $P_{max}$; and first calculating means for calculating the beam width $D_{\sigma x}$ by means of the following equation:

$$D_{\sigma x} = \left\{ \frac{4W_F^2}{(M_{max} - M_{min})} \left( M_{max} - \frac{P_{max}}{P_0} \right) \right\}^{1/2}.$$

According to the present invention, there is also provided a method for measuring a beam width $D_{\sigma x}$ along a transverse direction of a laser beam having a full power $P_0$ and a given optical irradiance distribution. The method comprises the steps of:

(a) scanning a transverse direction X of a first optical filter with the laser beam to produce a first light signal modified by the filter during the scanning, the filter having a transmittance or reflectance profile M(x) varying along the transverse direction X and characterized by lines of constant transmittance or reflectance along a transverse direction Y which is perpendicular to the direction X, the profile M(x) varying along the direction X according to a one-dimensional inverted parabola with a central maximum $M_{max}$ and two peripheral minima $M_{min}$ separated by a distance $W_F$ where a part of the laser beam falling outside the peripheral minima $M_{min}$ of the inverted parabola is substantially blocked, the profile M(x) being defined by the following equation:

$$M(x) = M_{max} - \frac{4(M_{max} - M_{min})}{W_F^2} (x - x_c)^2$$

where $M_{min}$, $M_{max}$ and $W_F$ are predetermined constants and $x_c$ is the value of x at a central position along the distance $W_F$, $W_F$ being wide enough so that a part of the laser beam which spills past boundaries determined by minima $M_{min}$ is negligible when the profile M(x) is centered on the optical irradiance distribution of the laser beam;

(b) detecting the light signal produced in step (a) to determine a maximum power value $P_{max}$; and (c) calculating the beam width $D_{\sigma x}$ by means of the following equation:

$$D_{\sigma x} = \left\{ \frac{4W_F^2}{(M_{max} - M_{min})} \left( M_{max} - \frac{P_{max}}{P_0} \right) \right\}^{1/2}.$$

BRIEF DESCRIPTION OF THE DRAWINGS

In order to impart full understanding of the manner in which the above mentioned object and others are attained in accordance with the present invention, preferred embodiments thereof will be described hereinafter with reference to the accompanying drawings wherein.

DESCRIPTION OF THE DRAWINGS

Figure 1:
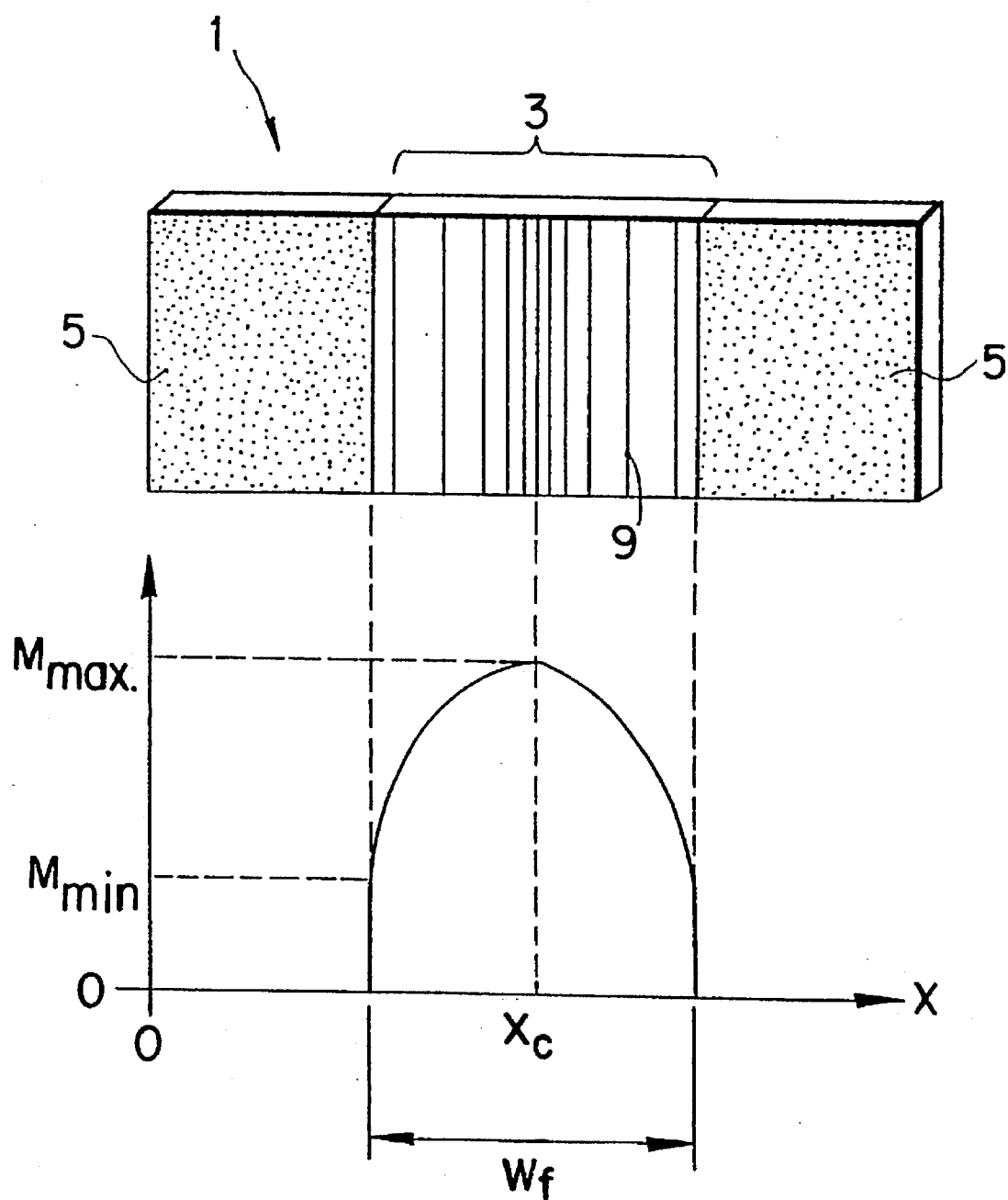
FIG. 1 is a schematic view comprising a perspective view of an optical filter and an associated diagram showing the transmittance or reflectance thereof with respect to distance x, according to the present invention.

In the following description of the drawings, the same reference numerals will refer to the same structural elements.

Referring to FIG. 1, there is shown an optical filter 1. This optical filter has a transmittance or reflectance area 3 which is not spatially uniform and which varies along one transverse direction. The transmittance or reflectance area 3 has a transmittance or reflectance profile M(x) shown on the schematic below the optical filter. The transmittance or reflectance profile M(x) depicted is one-dimensional, varies along the X direction and is characterized by lines of constant transmittance or reflectance along a transverse direction Y which is perpendicular to the direction X. The schematic lines 9 of constant transmittance or reflectance are therefore oriented parallel to the Y direction.

The profile M(x) varies along the direction X according to a one-dimensional inverted symmetric parabola with a central maximum $M_{max}$ and two peripheral minima $M_{min}$ separated by a distance $W_F$. This distance $W_F$ is the width of the transmittance or reflectance profile along the X direction, defined as the distance between both optical filter's boundaries. By having blocking screens 5 on both sides of the optical filter 1, the profile M(x) is made equal to zero for positions for which the x coordinate is outside the above-mentioned filter boundaries.

At the optical filter's boundaries along the X direction, the transmittance or reflectance drops from the minimum value $M_{min}$ down to zero. $X_C$ represents a distance between the abscissa of a center position of the profile M(x) and the origin of a fixed cartesian X-Y reference frame.

The transmittance or reflectance profile M(x) patterned on the optical filter 1 is given by a truncated symmetrical parabolic (second order polynomial) function of the x coordinate only:

$$M(x) = M_{max} - \frac{4(M_{max} - M_{min})}{W_F^2} (x - x_c)^2 \quad (1)$$

for horizontal positions x in the range $x_c - W_F/2 \leq x \leq x_c + W_F/2$.

Figure 2:
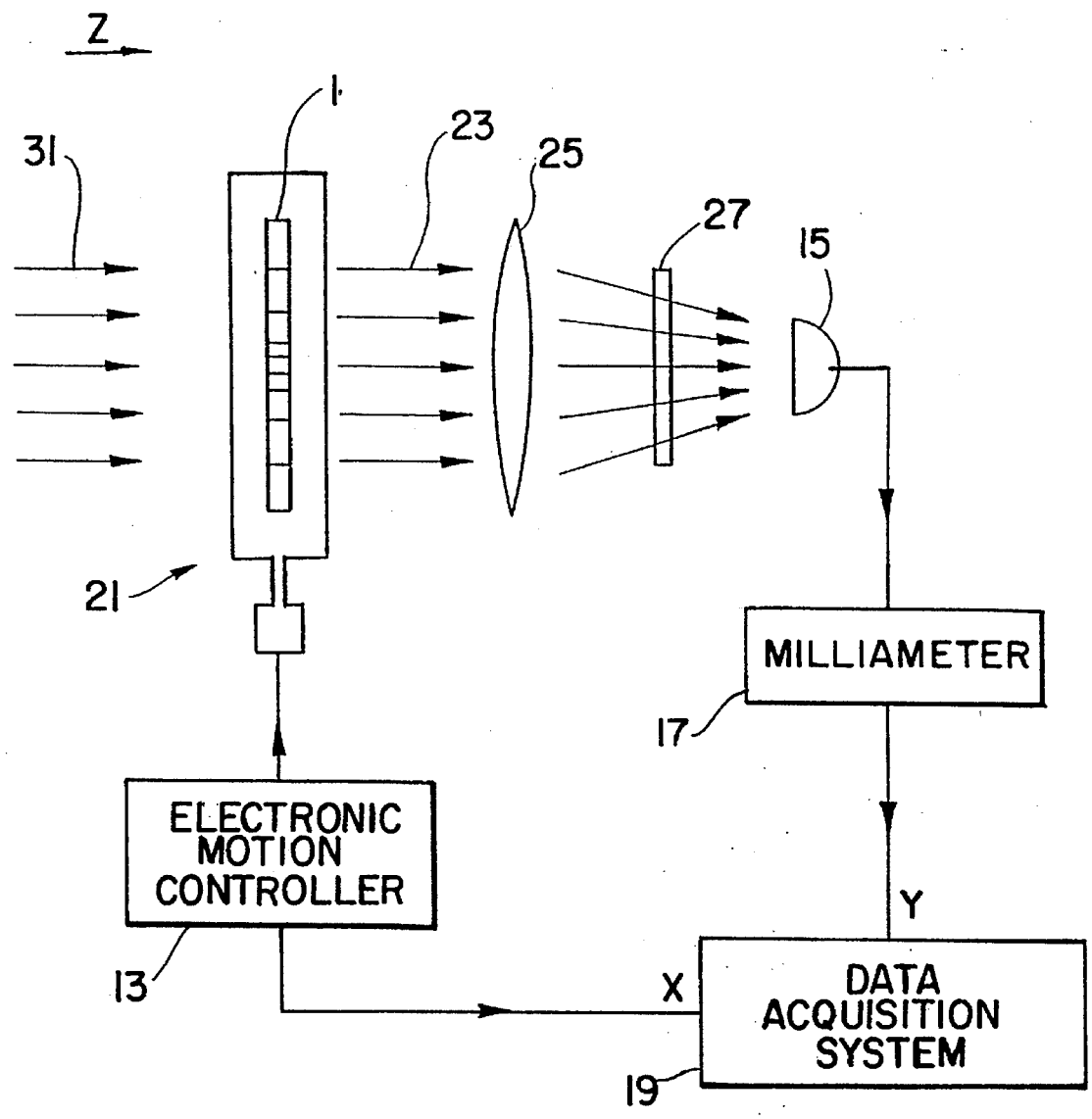
FIG. 2 is a block diagram of an apparatus for measuring a beam width $D_{ox}$ along a transverse direction of a laser beam, using a transmittance optical filter according to a first preferred embodiment of the present invention.
Figure 4:
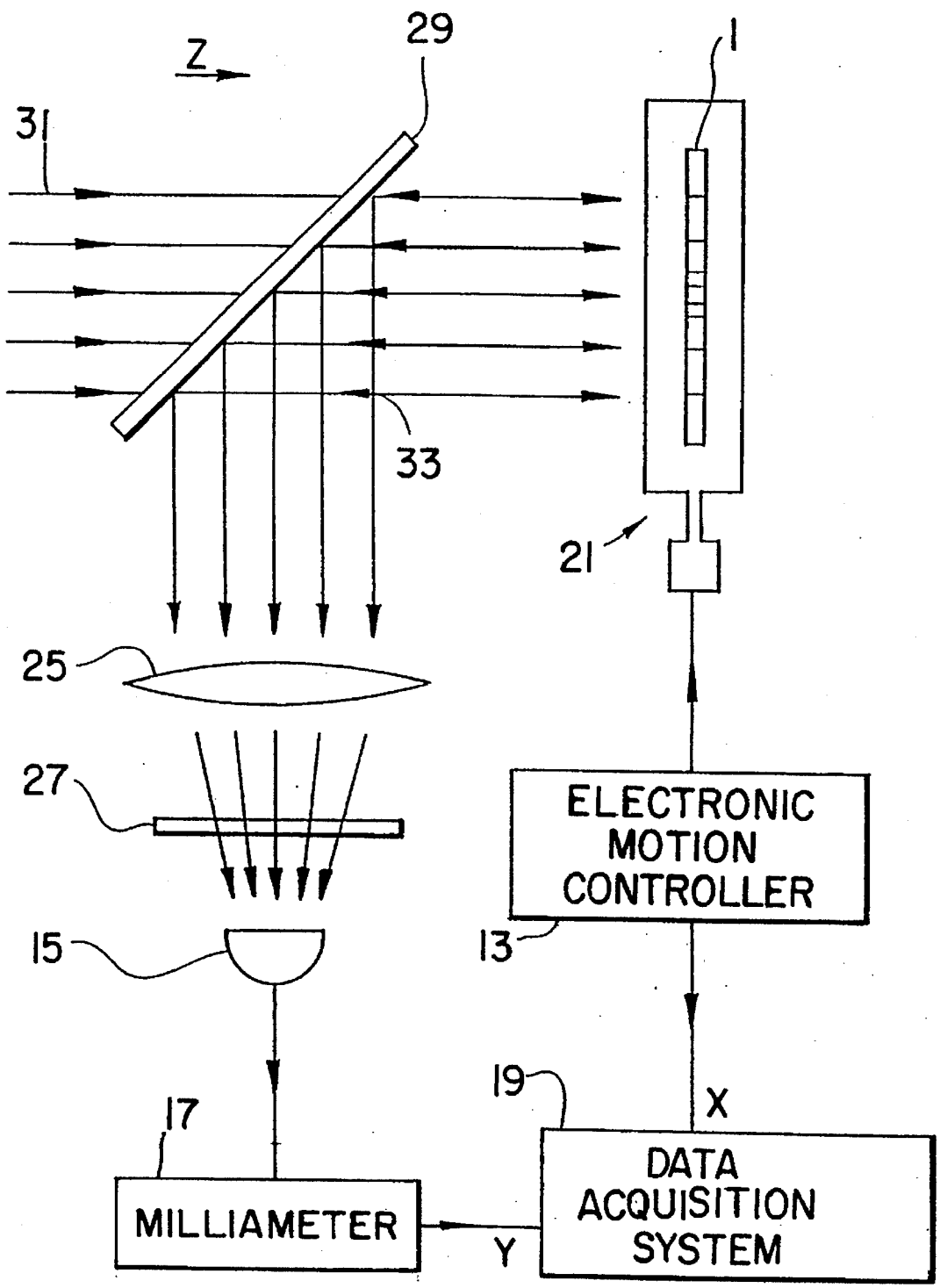
FIG. 4 is a block diagram of an apparatus for measuring a beam width $D_{ox}$ along a transverse direction of a laser beam using a reflectance optical filter according to a second preferred embodiment of the present invention.

Referring now to FIGS. 2 and 4, there are shown apparatuses for measuring a beam width $D_{ox}$ along a transverse direction of a laser beam having a full power $P_0$ and a given optical irradiance distribution.

Each of these apparatuses has a first optical filter 1 having a transmittance or reflectance profile M(x) varying along a transverse direction X and being characterized by lines of constant transmittance or reflectance along a transverse direction Y which is perpendicular to the direction X, the profile M(x) varying along the direction X according to a one-dimensional inverted parabola with a central maximum $M_{max}$ and two peripheral minima $M_{min}$ separated by a distance $W_F$ where a part of the laser beam falling outside the peripheral minima $M_{min}$ of the inverted parabola is substantially blocked, the profile M(x) being defined by the following equation:

$$M(x) = M_{max} - \frac{4(M_{max} - M_{min})}{W_F^2} (x - x_c)^2 \quad (1)$$

where $M_{min}$, $M_{max}$ and $W_F$ are predetermined constants and $x_c$ is the value of x at a central position along the distance $W_F$, $W_F$ being wide enough so that a part of the laser beam which spills past boundaries determined by minima $M_{min}$ is negligible when the profile M(x) is centered on the optical irradiance distribution of the laser beam.

Each of the apparatuses also comprises first scanning means for scanning the transverse direction X of the first optical filter 1 with the laser beam 31; an optical detector for detecting a light signal modified by the first optical filter 1 to produce a first output signal accordingly; signal processing and detecting means for processing the output signal of the optical detector to determine a maximum power value $P_{max}$; and first calculating means for calculating the beam width $D_{ox}$ by means of the following equation:

$$D_{ox} = \left\{ \frac{4W_F^2}{(M_{max} - M_{min})} \left( M_{max} - \frac{P_{max}}{P_0} \right) \right\}^{1/2} \quad (2)$$

Preferably, the first scanning means comprise a motorized X-translation stage 21 in which, in operation, the first optical filter 1 is mounted, and a motion controller 13 for controlling operation of the motorized X-translation stage 21.

Preferably, the optical detector comprises a converging lens 25 for receiving the light signal from the first optical filter 1, a neutral density filter 27 for receiving light from the converging lens 25, a photodetector 15 for receiving light from the neutral density filter 27 and a milliammeter 17 for receiving an output signal from the photodetector 15 and for providing an output voltage signal proportional to the output signal of the photodetector 15.

Preferably, the signal processing and detecting means and the first calculating means are provided by a data acquisition system 19 which has a first input for receiving an output signal from the milliammeter 17 and a second input for receiving an output signal from the motion controller 13. This second input is indicative of a horizontal movement of the X-translation stage 21.

Referring to FIG. 2, there is shown a first preferred embodiment of the invention. The first optical filter 1 is a transmittance filter 1 having a transmittance profile corresponding to the profile M(x) of FIG. 1. Its transmittance profile is wide enough so that the fraction of the incident optical power that spills past the boundaries of the region of parabolic transmittance is negligible when the transmittance profile is centered on the optical irradiance distribution.

The incident light beam 31, whose beam width is to be measured, is represented by a bunch of rays and propagates along an optical axis Z. The light beam 31 impinges on the optical filter 1 mounted on the motorized X-translation stage 21. The motion of the X-translation stage 21 is controlled by the electronic motion controller 13, and allows for the horizontal motion of the optical filter 1 at a constant velocity in the plane perpendicular to the optical axis Z. The motion controller 13 also generates the signal output indicative of the horizontal displacement of the X-translation stage 21, this signal being sent to the X input (abscissa) of the data acquisition system 19. The data acquisition can be effected in a variety of ways, for example by using a personal computer equipped with an analog-to-digital conversion board and controlled by suitable software, or more simply by using a X-Y chart recorder which provides a hard copy of the continuous signal recorded.

The optical irradiance distribution of the beam 23 transmitted through the optical filter 1, is focused onto the single photodetector 15 by means of the converging lens 25 located behind the optical filter 1. The aperture of the converging lens 25 must be sufficient for collecting the full power contained within the transmitted beam 23. The diameter of the converging lens 25 should then be at least equal to the width $W_F$ of the parabolic transmittance profile patterned on the optical filter 1. The distance between the converging lens 25 and the photodetector 15 is set approximately equal to the focal length of the converging lens 25, so that the transmitted optical beam 23 is focused in a central spot smaller than the sensitive area of the photodetector 15.

For high-power laser beams, saturation of the photodetector's response or optical damage to its sensitive area due to excessive optical irradiance can be avoided by inserting the neutral density filter 27 or any other suitable optical attenuation component between the converging lens 25 and the photodetector 15. For incident light beams of visible or near-infrared wavelength, a silicon photodiode can be used. In any case, the wavelength of the incident light beam 31 should lie within the spectral responsivity curve of the photodetector 15.

The photodetector output signal is sent to the milliammeter 17 which provides an output voltage signal proportional to the input current signal. The output of the milliammeter 17 is connected to the Y input (ordinate) of the data acquisition system 19. At the end of a complete travel of the optical filter 1 along the horizontal direction, the data acquisition system 19 has recorded a curve of a signal $P(x_c)$ proportional to the optical power transmitted through the optical filter 1 as a function of the position $x_c$ of the center of the transmittance profile M(x) patterned on the optical filter 1. The horizontal motion of the optical filter 1 is continued up to a position for which the optical filter 1 no longer intercepts the incident optical beam 31. At this position, the full power contained within the incident optical beam 31 is received by the photodetector 15, which gives a response $P_0$.

Figure 3A:
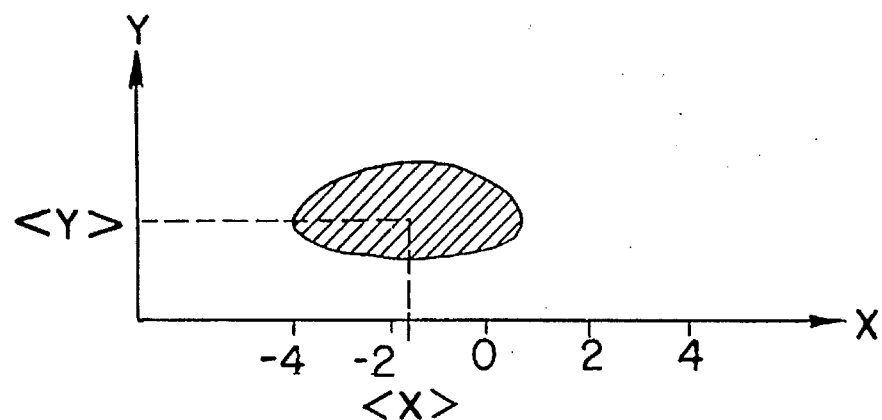
FIG. 3A is a schematic cross section of the optical irradiance distribution incident to the optical filter of the apparatus shown on FIG. 2.
Figure 3B:
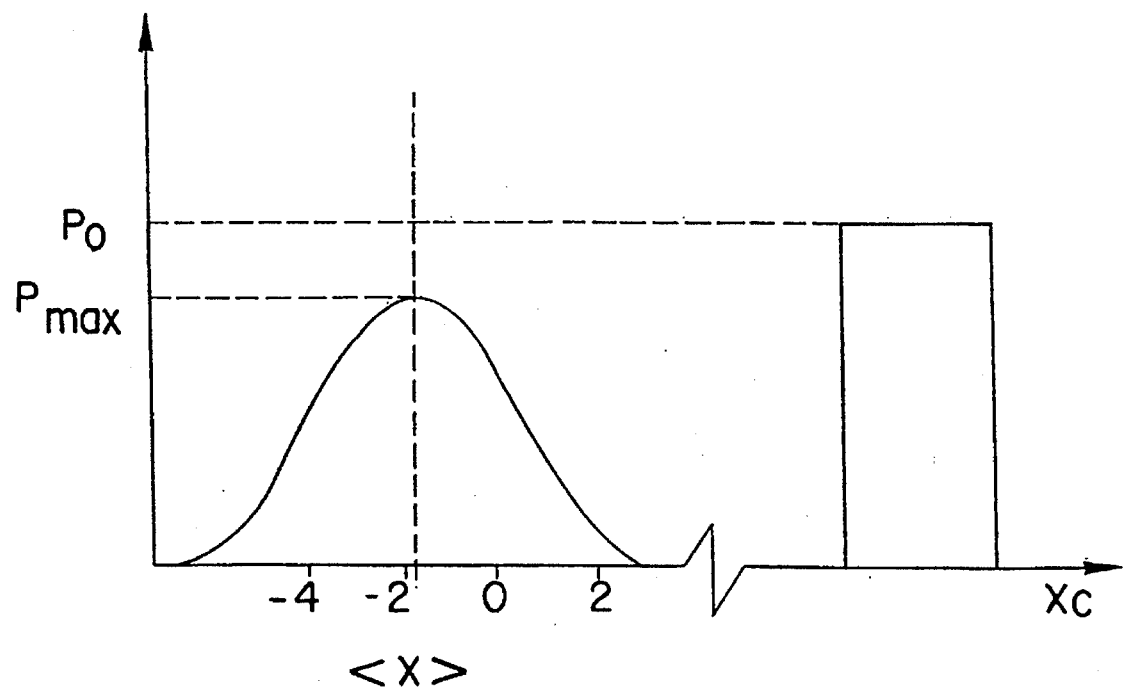
FIG. 3B is a schematic associated with FIG. 3A, showing the detector output signal with respect to distance for the optical irradiance distribution.

A schematic example of the curve $P(x_c)$ along with the signal $P_0$ is presented in FIG. 3B for an arbitrary incident irradiance distribution I(x,y), whose cross section in the plane of the optical filter is depicted schematically in FIG. 3A. $P_{max}$ represents the maximum value of the displayed curve $P(x_c)$. The maximum signal $P_{max}$ is obtained when the horizontal position of the center $x_c$ of the transmittance profile M(x) becomes coincident with the position of the first moment $<x>$ of the optical irradiance distribution incident on the optical filter 1. This permits a fast measurement of the first moment $<x>$ in the fixed cartesian X-Y reference frame. For convenience and simplicity, the position $x_c=0$ can be adjusted to coincide with the optical axis (x=0) of the measurement apparatus. But, in general, the first moment of the incident irradiance distribution does not coincide with the optical axis i.e., $<x>\neq 0$ in the fixed reference frame.

The measurement of both signals $P_{max}$ and $P_0$ allows for the calculation of the beam width $D_{\sigma x}$ along the X direction of the incident optical beam 31 by using the following formula:

$$D_{\sigma x} = \left\{ \frac{4W_F^2}{(M_{max} - M_{min})} \left( M_{max} - \frac{P_{max}}{P_0} \right) \right\}^{1/2} \quad (2)$$

The parameters $W_F$, $M_{max}$ and $M_{min}$ characterizing the optical filter 1 have been defined above. Note that the beam width measured according to the apparatus presently described holds for the optical irradiance distribution located in the same transverse X-Y plane as the optical filter 1. The beam width varies more or less along the propagation axis Z, depending on the divergence characteristics of the optical beam 31.

Knowledge of the following points can result in an easier and more efficient use of an apparatus based on this first preferred embodiment of the present invention:

an absolute calibration of the photodetector 15 is not required, because the beam width $D_{\sigma x}$ is obtained directly from the ratio of the measured signals $P_{max}$ and $P_0$;

when the data acquisition 19 is effected by digital means, suitable software can be provided for extracting the signals $P_{max}$ and $P_0$ from the recorded data and for calculating the beam width using Eq. (2); and the record of the signal $P(x_c)$ can be limited to a small region of values of $x_c$ centered around the first moment of the optical irradiance distribution, because only the peak value $P_{max}$ of the signal is required for measuring the beam width $D_{\sigma x}$.

Referring now to FIG. 4, there is shown a second preferred embodiment of the present invention, based on the use of an optical filter 1 having a reflectance profile M(x) along the horizontal X direction as first optical filter. The basic characteristics of the reflectance profile M(x) patterned on the optical filter 1 are the same as those of the profile illustrated in FIG. 1 and described in the first embodiment of the measurement apparatus.

The reflectance profile is thus given by a truncated symmetrical parabolic function having a maximum value $M_{max}$ at its center, and the width $W_F$ is given by the distance between both boundaries where the reflectance drops from the minimum value $M_{min}$ down to zero. The region of parabolic reflectance is physically truncated by using 100% absorbing screens 5 on both sides of the optical filter 1. The optical filter 1 is mounted on the motorized X-translation stage 21. A high-quality beamsplitter 29 tilted at an angle of 45° with respect to an optical axis of the apparatus is placed in front of the optical filter 1. A portion of the incident optical beam 31 passes through the beamsplitter 29 and then impinges on the optical filter 1. The optical quality of the beamsplitter 29 should be sufficient for altering in a negligible manner the transverse irradiance distribution of the optical beam transmitted though it or reflected upon its faces.

The optical beam 33 reflected by the moving optical filter 1 returns back to the beamsplitter 29, where one part of this beam is then deviated at an angle of 90° by the beamsplitter 29 towards the converging lens 25. The description of the X-translation stage 21, the motion controller 13, the data acquisition system 19, the photodetector 15, the converging lens 25, the neutral density filter 27 and the milliammeter 17 proceeds in the same way as for the description of the corresponding elements in the first embodiment of the measurement apparatus.

The beam width $D_{\sigma x}$ along the X direction of the optical irradiance distribution in the plane of the optical filter 1 is given by the same formula described before:

$$D_{\sigma x} = \left\{ \frac{4W_F^2}{(M_{max} - M_{min})} \left( M_{max} - \frac{P_{max}}{P_0} \right) \right\}^{1/2} \quad (3)$$

where $P_{max}$ is the peak value of the curve $P(x_c)$ recorded by the data acquisition system 19, and $P_0$ is a signal proportional to the full power of the unobstructed optical irradiance in the plane of the optical filter 1.

Note that in this second embodiment, the power $P_0$ differs from the full power of the incoming optical beam 31 due to the non-unity transmission coefficient of the beamsplitter 29. The signal $P_0$ is measured by placing a 100%-reflecting flat mirror on the X-translation stage 21 beside the optical filter 1, so that the incident optical beam can be reflected without attenuation towards the beamsplitter 29 after the optical filter 1 has completed its travel across the beam irradiance distribution 31.

In the same way as for the absolute calibration of the photodetector 15, knowledge of the specific transmission and reflection coefficients of the beamsplitter 29 is not required because only the ratio of the measured signals $P_{max}$ and $P_0$ appears in the formula needed for calculating the beam width $D_{\sigma x}$.

Referring to FIGS. 2 and 4, in operation, the method consists in the following steps:

(a) scanning a transverse direction X of a first optical filter 1 with the laser beam 31 to produce a first light signal modified by the filter 1 during the scanning, the filter having a transmittance or reflectance profile M(x) varying along the transverse direction X and characterized by lines of constant transmittance or reflectance along a transverse direction Y which is perpendicular to the direction X, the profile M(x) varying along the direction X according to a one-dimensional inverted parabola with a central maximum $M_{max}$ and two peripheral minima $M_{min}$ separated by a distance $W_F$ where a part of the laser beam falling outside the peripheral minima $M_{min}$ of the inverted parabola is substantially blocked, the profile M(x) being defined by the following equation:

$$M(x) = M_{max} - \frac{4(M_{max} - M_{min})}{W_F^2} (x - x_c)^2$$

where $M_{min}$, $M_{max}$ and $W_F$ are predetermined constants and $x_c$ is the value of x at a central position along the distance $W_F$, $W_F$ being wide enough so that a part of the laser beam which spills past boundaries determined by minima $M_{min}$ is negligible when the profile M(x) is centered on the optical irradiance distribution of the laser beam;

(b) detecting the light signal produced in step (a) to determine a maximum power value $P_{max}$; and (c) calculating the beam width $D_{\sigma x}$ by means of the following equation:

$$D_{\sigma x} = \left\{ \frac{4W_F^2}{(M_{max} - M_{min})} \left( M_{max} - \frac{P_{max}}{P_0} \right) \right\}^{1/2}.$$

Preferably, the scanning of the step (a) also comprises the step of translating the first optical filter 1 along the direction X thereof by means of a motorized X-translation stage 21 in which the first optical filter is mounted, and the detecting of step (b) comprises the steps of:

(i) converging the light signal received from the first optical filter 1;

(ii) attenuating by means of a neutral density filter light converged in the step (i);

(iii) photo-detecting light attenuated in the step (ii) to generate an output signal accordingly; and (iv) processing the signal generated in the step (iii) to provide an output voltage signal proportional to the output signal generated in the step (iii).

Referring more particularly to FIG. 2, in step (a), the first optical filter 1 is preferably a transmittance filter.

Referring now more particularly to FIG. 4, in the step (a), the first optical filter is a reflectance filter and the step (a) further comprises the step of perpendicularly reflecting the light signal reflected back from the reflectance filter.

The method of these first and second embodiments permits a direct measurement of the beam width $D_{\sigma x}$ of the optical beam irradiance distribution 31 based on the optical filter 1, having either a transmittance or a reflectance profile that is swept across the beam irradiance distribution 31. The peak value of the curve of the power transmitted through (reflected by) the optical filter 1 as a function of the filter's translation allows for a direct determination of the beam width.

For convenience, we will limit the following description of the method to transmittance optical filters, although the method applies to reflectance optical filters as well. Also, we assume that the beam width is measured for a transverse direction parallel to the horizontal X axis of the chosen fixed reference frame. The symbol $D_{\sigma x}$ will then be used for the beam width obtained from the variance $\sigma_x^2$, defined in the following way:

$$D_{\sigma x} = 4\sqrt{\sigma_x^2} = 4\sqrt{\langle x^2 \rangle - \langle x \rangle^2} \quad (3)$$

where $\langle x \rangle$ and $\langle x^2 \rangle$ are respectively the first and second moments along the X direction of the beam irradiance distribution 31. The expressions for the first and second moments read as:

$$\langle x \rangle = \frac{1}{P_0} \int_{-\infty}^{+\infty} \int_{-\infty}^{+\infty} x I(x,y) dx dy \quad (4a)$$

$$\langle x^2 \rangle = \frac{1}{P_0} \int_{-\infty}^{+\infty} \int_{-\infty}^{+\infty} x^2 I(x,y) dx dy \quad (4b)$$

where $P_0$ gives the full power contained within the optical beam irradiance distribution 31 when I(x,y) is expressed in units of power per unit area (W/m²):

$$P_0 = \int_{-\infty}^{+\infty} \int_{-\infty}^{+\infty} I(x,y) dx dy. \quad (5)$$

The expressions for the first and second moments $\langle x' \rangle$ and $\langle x'^2 \rangle$ along any given transverse direction rotated by an angle $\phi$ with respect to the X axis are readily derived by substituting the variable x in Eqs. (4a) and (4b) by the new variable x'=x cos(φ)+y sin(φ). The factor of 4 which appears in Eq. (3) is included to make the beam width $D_{\sigma x}$ equal to twice the Gaussian spot size parameter $w_x$ along the X direction for the case of the widely encountered Gaussian optical irradiance distribution:

$$I(x, y) = I_0 \exp\left[-2\left(\frac{x^2}{w_x^2} + \frac{y^2}{w_y^2}\right)\right]. \quad (6)$$

For the above irradiance distribution the beam width $D_{\sigma x}$ can then be thought of as the distance along the X direction between both points on either side of the center position where the local irradiance attains $I_O/e^2$ (0.135 $I_O$), $I_O$ being the central peak irradiance.

As described before, the transmittance profile of the transmittance optical filter is given by a symmetrical truncated parabolic function of the x coordinate:

$$M(x) = M_{max} - \frac{4(M_{max} - M_{min})}{W_F^2}(x - x_c)^2 \quad (1)$$

for $x_c - W_F/2 \leq x \leq x_c + W_F/2$, and $M(x)=0$ elsewhere, as depicted schematically in FIG. 1. The abscissa of the central peak transmittance $M_{max}$ is located at a distance $x_c$ from the origin of the cartesian X-Y reference frame. $W_F$ represents the distance separating the boundaries of the region of parabolic transmittance along the X direction. At these boundaries the transmittance drops from the minimum value $M_{min}$ down to zero, and the transmittance remains null for values of the x coordinate beyond these boundaries.

The measurement of irradiance moments of order higher than the second order can be achieved by using transmittance profiles described by polynomial functions of appropriate order. Somehow, the measurement of such higher-order moments does not form part of the present invention.

When an optical irradiance distribution I(x,y) impinges on the transmittance optical filter 1, the power P of the portion of the optical beam transmitted through the filter is given by the overlap integral:

$$P = \int_{-\infty}^{+\infty} \int_{-\infty}^{+\infty} M(x, y) I(x, y) dx dy. \quad (7)$$

If we assume that the optical irradiance I(x,y) is negligible in regions beyond the boundaries of the transmittance optical filter 1, the following expression for the transmitted power P as a function of the filter's center position $x_c$ is obtained by reporting the transmittance profile described by Eq. (1) into the overlap integral (7):

$$P = M_{max} \int_{-\infty}^{+\infty} \int_{-\infty}^{+\infty} I(x, y) dx dy -$$

$$\frac{4(M_{max} - M_{min})}{W_F^2} \left\{ \int_{-\infty}^{+\infty} \int_{-\infty}^{+\infty} x^2 I - \right.$$

$$\left. 2x_c \int_{-\infty}^{+\infty} \int_{-\infty}^{+\infty} x I(x, y) dx dy + x_c^2 \int_{-\infty}^{+\infty} \int_{-\infty}^{+\infty} I(x, y) dx dy \right\}.$$

The above assumption is in fact essential in this demonstration and it allows for writing the various integrals of Eq. (8) with infinite limits of integration. This assumption requires that the area of the transmittance optical filter 1 be much larger than that of the incident irradiance distribution. Equations (4a), (4b) and (5) can then be substituted in Eq. (8), leading to the following result:

$$\frac{P(x_c)}{P_0} = M_{max} - \frac{4(M_{max} - M_{min})}{W_F^2}\{<x^2> - 2x_c<x> + x_c^2\}. \quad (9)$$

The second moment $<x^2>$ can be dropped from the above equation by using Eq. (3). It is then found that the transmitted power P normalized to the full power $P_0$ of the incident irradiance distribution varies quadratically as a function of the center position $x_c$ of the optical filter:

$$\frac{P(x_c)}{P_0} = M_{max} - \frac{(M_{max} - M_{min})}{W_F^2}\left\{\frac{D_{\sigma_x}^2}{4} + 4(x_c - <x>)^2\right\} \quad (10)$$

where the beam width $D_{\sigma x}$ and the first moment $<x>$ appear as parameters of the parabolic curve $P(x_c)$. These two parameters are readily measured by noting from the above equation that the power $P(x_c)$ transmitted through the filter peaks when the central position $x_c$ of the optical filter corresponds to the position of the first moment $<x>$ of the optical irradiance distribution 31. If we denote the maximum transmitted power by $P_{max}$ and if we let $x_c=<x>$ in Eq. (10), the expression for the beam width $D_{\sigma x}$ in terms of the ratio $P_{max}/P_0$ of the measured signals is readily obtained:

$$D_{\sigma x} = \left\{\frac{4W_F^2}{(M_{max} - M_{min})}\left(M_{max} - \frac{P_{max}}{P_0}\right)\right\}^{1/2}. \quad (2)$$

We recall that Eq. (2) was obtained using the convenient assumption that the width $W_F$ of the transmittance profile (see FIG. 1) is much larger than the beam width $D_{\sigma x}$.

Figure 7:
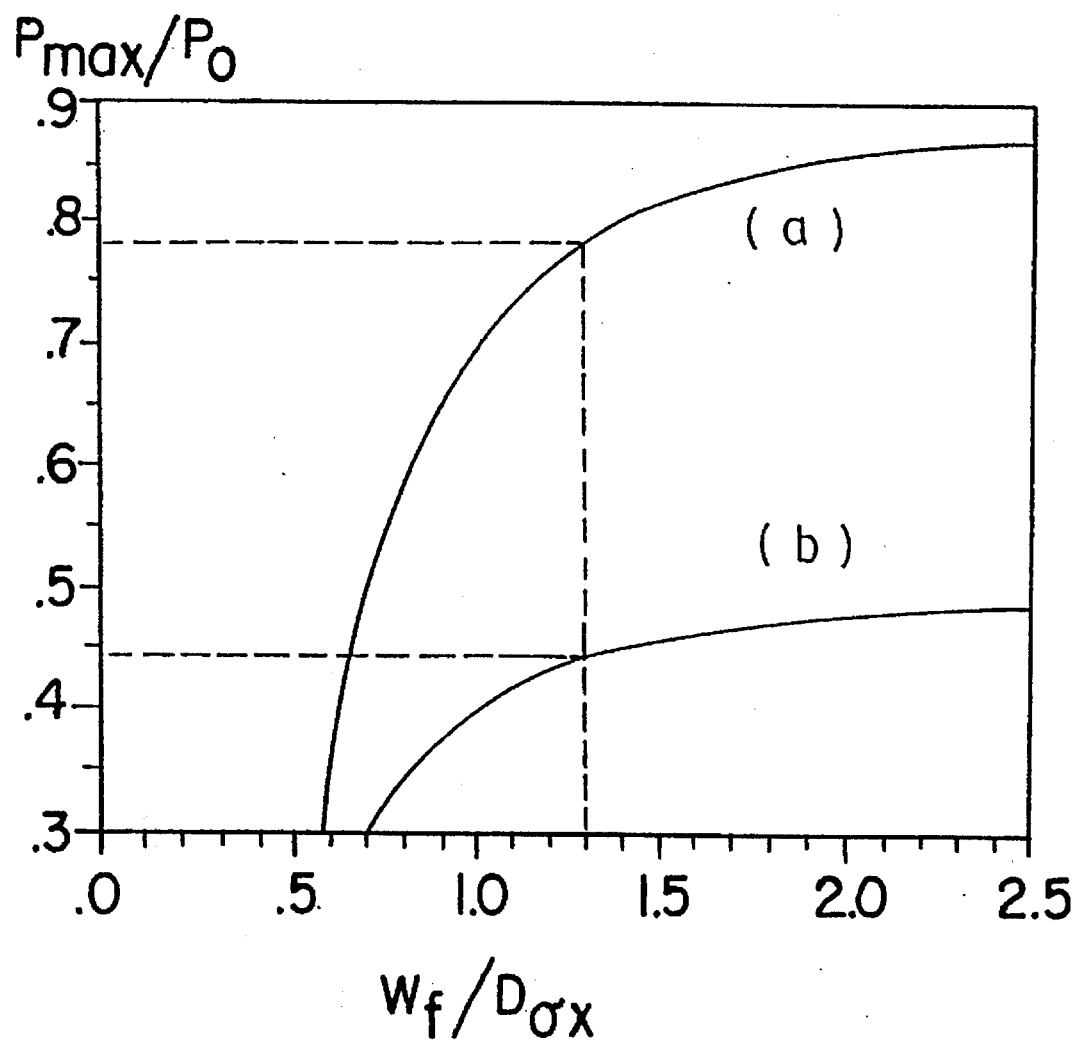
FIG. 7 is a schematic showing a ratio of $P_{max}/P_0$ with respect to a ratio of $W_F/D_{ox}$ according to the present invention.

FIG. 7 depicts the curves which relate the ratio $P_{max}/P_0$ to the ratio $W_F/D_{\sigma x}$ as given by Eq. (2), for the following values of the peak and minimum transmittances: (a)$M_{max}$=0.9,$M_{min}$=0.1, and (b)$M_{max}$=0.5,$M_{min}$=0.1.

Results of numerical simulations of an apparatus based on the present method have shown that the clipping effects due to a transmittance profile not wide enough are negligible as far as the ratio $W_F/D_{\sigma x}$ of the filter's width to the incident beam width is kept larger than ~1.3. This finding holds for a wide variety of beam irradiance distribution, including the Gaussian one. The curves of FIG. 7 then show that clipping effects should be suspected when the measured ratios $P_{max}/P_O$ are found to be smaller than ~0.78 and 0.44 for the cases (a) and (b), respectively, as indicated by the dashed lines in FIG. 7.

As a consequence, the presence of detrimental clipping effects caused by a narrow transmittance profile can be readily detected from the measured ratio $P_{max}/P_0$, which should not decrease below a minimum value dictated by the chosen threshold ratio $W_F/D_{\sigma x}$ (a ratio $\geq 1.3$ is recommended) and by the parameters of the transmittance profile patterned on the optical filter 1. Also, the detrimental consequences resulting from imperfections in the patterned transmittance profile are minimized by using profiles having values of $M_{max}$ and $M_{min}$ as different as possible.

A more complete characterization of two-dimensional irradiance distributions requires at least the measurement of the beam width $D_{\sigma y}$ along the vertical Y direction, along with the measurement of the angle θ that makes the principal U-V axes of the beam irradiance distribution I(x,y) relative to the X axis of the fixed reference frame. The orthogonal principal axes U and V of I(x,y) are defined as the directions for which the covariance $\sigma_{uv}$ given by $$\sigma_{uv} = \int_{-\infty}^{+\infty} \int_{-\infty}^{+\infty} I(x, y) uv \, dx dy - <u><v> \quad (11)$$

vanishes, $<u>$ and $<v>$ being the first moments of I(x,y) along the principal axes.

Figure 8A:
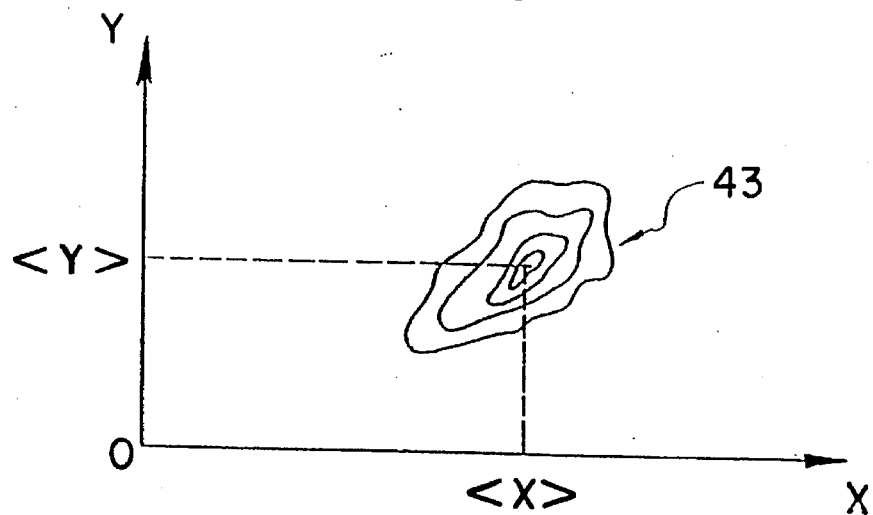
FIG. 8A is a schematic cross section of the optical irradiance distribution incident to the optical filter of the apparatus shown on FIG. 2.
Figure 8B:
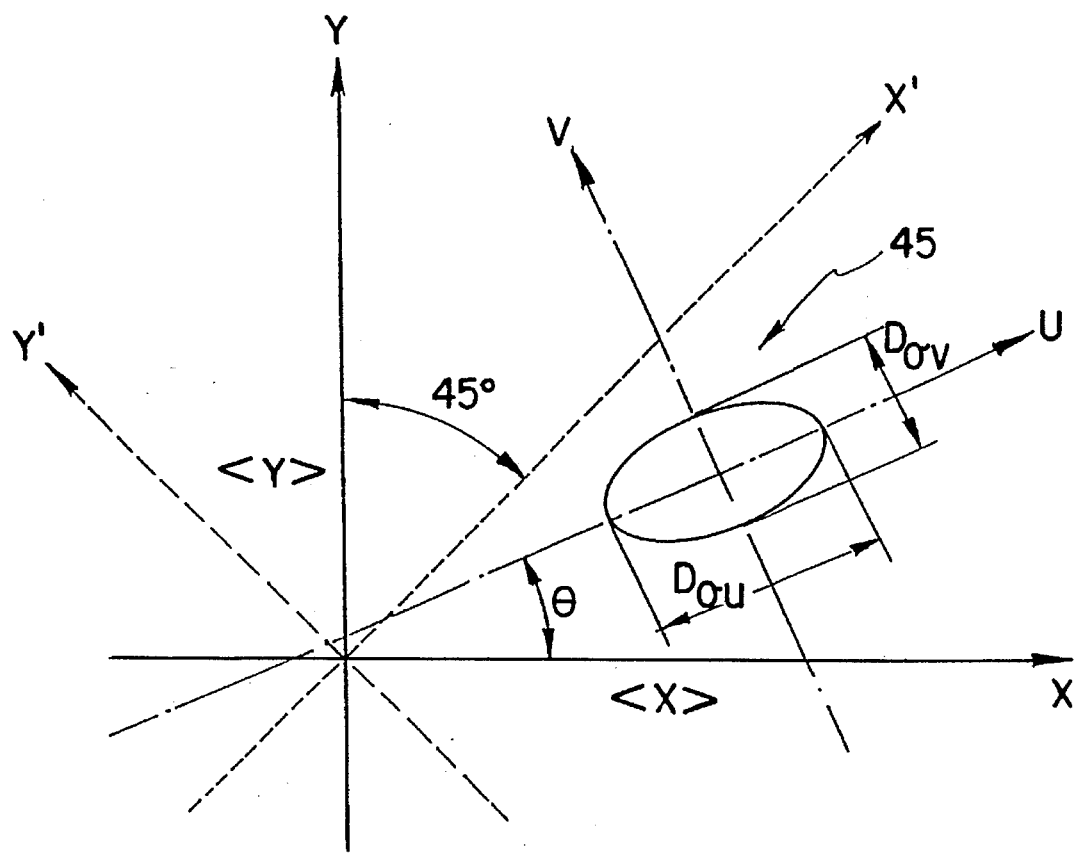
FIG. 8B is a schematic of an equivalent ellipse of constant irradiance corresponding to the optical irradiance distribution of FIG. 8A.

Referring now to FIGS. 8A and 8B, in addition, within the second-moment approach, an arbitrary beam irradiance distribution 43 is made equivalent to a constant irradiance distribution 45 having an elliptical shape. This ellipse of constant irradiance 45 has major and minor axes of length equal to $D_{\sigma u}$ and $D_{\sigma v}$ (or conversely), where $D_{\sigma u}$ and $D_{\sigma v}$ are the beam widths along the principal axes of the incident irradiance distribution 43. The ellipse is centered at the point of coordinates (<x>,<y>).

The procedure described in the following paragraphs shows that the equivalent ellipse of constant irradiance 45 of any given incident optical beam can be fully characterized simply from three horizontal travels of a transmittance optical filter, achieved by devising an apparatus relating to the present invention. A reflectance optical filter could be used as well, but for concision purposes, the following description will refer to transmittance optical filter only.

Figure 6:
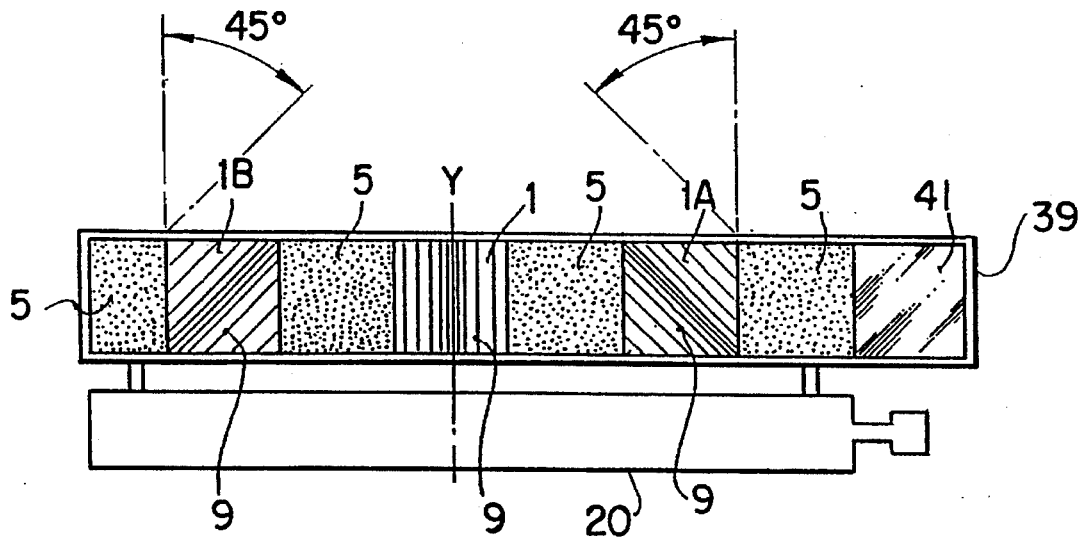
FIG. 6 is a front elevational view of optical filters mounted on a support frame, according to fourth embodiments of the present invention.

Referring now to FIG. 6, for one of these travels the lines of constant transmittance 9 of the optical filter 1 are oriented along the vertical Y axis, while for the two remaining travels the lines of constant transmittance 9 are rotated at angles of 45° on either sides of the Y axis.

Referring now to FIG. 8B, it will be convenient to introduce another orthogonal X'-Y' reference frame whose axes are rotated by an angle of 45° with respect to the initial X-Y reference frame. In general, the orientation of the orthogonal principal U-V axes corresponds to neither X-Y nor X'-Y' reference frame, and is initially unknown for a given irradiance distribution.

The horizontal travel of the optical filter with its lines of constant transmittance oriented parallel to the X' axis allows for the measurement of the beam width $D_{\sigma y'}$, and vice versa. The expression for the beam width $D_{\sigma y}$ along the vertical Y direction is $D_{\sigma y} = 4(\sigma_y^2)^{1/2}$, with $$\sigma_y^2 = <y^2> - <y>^2$$

$$= \frac{1}{P_0} \int_{-\infty}^{+\infty} \int_{-\infty}^{+\infty} I(x', y') y^2 dx' dy' - \left\{ \frac{1}{P_0} \int_{-\infty}^{+\infty} \int_{-\infty}^{+\infty} I(x', y') y dx' dy' \right\}^2 \quad (12)$$

where, for convenience, the beam irradiance distribution is expressed in terms of the coordinates of the X'-Y' reference frame. Since this reference frame is tilted by an angle of 45° relative to the initial X-Y reference frame, the x and y coordinates are transformed into the x' and y' coordinates according to the rules:

$$x = \frac{1}{\sqrt{2}} (x' - y') \quad (13a)$$

$$y = \frac{1}{\sqrt{2}} (x' + y') \quad (13b)$$

Reporting the transformation (13b) into Eq. (12) leads to the result:

$$D_{\sigma y} = \{\tfrac{1}{2}(D_{\sigma x'}^2 + D_{\sigma y'}^2) + 16\sigma_{x'y'}\}^{1/2} \quad (14)$$

where $D_{\sigma x'}$ and $D_{\sigma y'}$ are the beam widths measured along the X' and Y' axes, respectively, and $\sigma_{x'y'}$ is the covariance defined along these axes. Using the same procedure, we find the following expression for the beam width $D_{\sigma x}$ in terms of parameters all defined within the X'-Y' reference frame:

$$D_{\sigma x} = \{\tfrac{1}{2}(D_{\sigma x'}^2 + D_{\sigma y'}^2) - 16\sigma_{x'y'}\}^{1/2} \quad (15)$$

Summing Eqs. (14) and (15) leads to an expression for $D_{\sigma y}$ in terms of the three measured beam widths $D_{\sigma x}$, $D_{\sigma x'}$, and $D_{\sigma y'}$:

$$D_{\sigma y} = \{D_{\sigma x'}^2 + D_{\sigma y'}^2 - D_{\sigma x}^2\}^{1/2} \quad (16)$$

The angle θ between the principal axis U of the beam irradiance distribution and the horizontal X axis is obtained by transforming the variables u and v of Eq. (11) into the variable x and y using the linear transformation rules u=x cos(θ)+y sin(θ) and v=y cos(θ)−x sin(θ). Reporting these transformations into Eq. (11) and letting $\sigma_{uv}=0$, we find $$\tan(2\theta) = \frac{2\sigma_{xy}}{\sigma_x^2 - \sigma_y^2} \quad (17)$$

On the other hand, using Eqs. (13a) and (13b) the covariance $\sigma_{xy}$ along the X and Y axes is readily expressed in terms of measured beam widths:

$$\sigma_{xy} = \tfrac{1}{32}(D_{\sigma x'}^2 - D_{\sigma y'}^2) \quad (18)$$

The expression for the angle θ in terms of measured beam widths is then obtained by reporting Eqs. (16) and (18) into Eq. (17). Thus:

$$\theta = \begin{cases} \tfrac{1}{2} \tan^{-1}(A) & \text{for } A > 0 \\ \tfrac{1}{2} \tan^{-1}(A) + \tfrac{\Pi}{2} & \text{for } A < 0 \end{cases} \quad (19)$$

where:

$$A = \frac{D_{\sigma x'}^2 - D_{\sigma y'}^2}{2D_{\sigma x}^2 - (D_{\sigma x'}^2 + D_{\sigma y'}^2)} . \quad (20)$$

The angle θ given by Eq. (19) is always within the first quadrant of the X-Y reference frame i.e., $0 \leq \theta \leq \pi/2$. This assumption avoids any ambiguity about the orientation of the U and V axes since the angle θ refers specifically to the angular separation between the U axis and the horizontal X axis.

The expressions for the beam widths $D_{\sigma u}$ and $D_{\sigma v}$ along the principal axes of the beam irradiance distribution in terms of the angle θ and of the three measured beam widths read as:

$$D_{\sigma u} = \{\cos(2\theta)D_{\sigma x}^2 + (\sin^2(\theta) + \sin(\theta)\cos(\theta))D + (\sin^2(\theta) - \sin(\theta)\cos(\theta))D_{\sigma y'}^2\}^{1/2} \quad (21a)$$

$$D_{\sigma v} = \{-\cos(2\theta)D_{\sigma x}^2 + (\cos^2(\theta) - \sin(\theta)\cos(\theta)) + (\cos^2(\theta) + \sin(\theta)\cos(\theta))D_{\sigma y'}^2\}^{1/2} \quad (21b)$$

Finally, the first moment <y> along the vertical Y direction can be deduced from the measured first moments <x'> and <y'>:

$$<y> = \frac{1}{\sqrt{2}} (<x'> + <y'>) \quad (22)$$

Note that the origin of the Y axis corresponds to the center of the optical filter along the vertical direction.

In summary, from the measured beam widths $D_{\sigma x}$, $D_{\sigma x'}$, and $D_{\sigma y'}$ and first moments <x>, <x'> and <y'>, Eg. (16) first gives the beam width $D_{\sigma y}$ along the vertical direction, while the first moment <y> is obtained using Eg. (22). Then, the angle θ between the principal axis U of the beam irradiance distribution and the horizontal X axis is obtained from Eqs. (19) and (20), while the beam widths along the principal axes are calculated using Eqs. (21a) and (21b). Note that the principal axes of an irradiance distribution having a perfect circular symmetry are not defined, since the covariance vanishes for any transverse direction.

Figure 5:
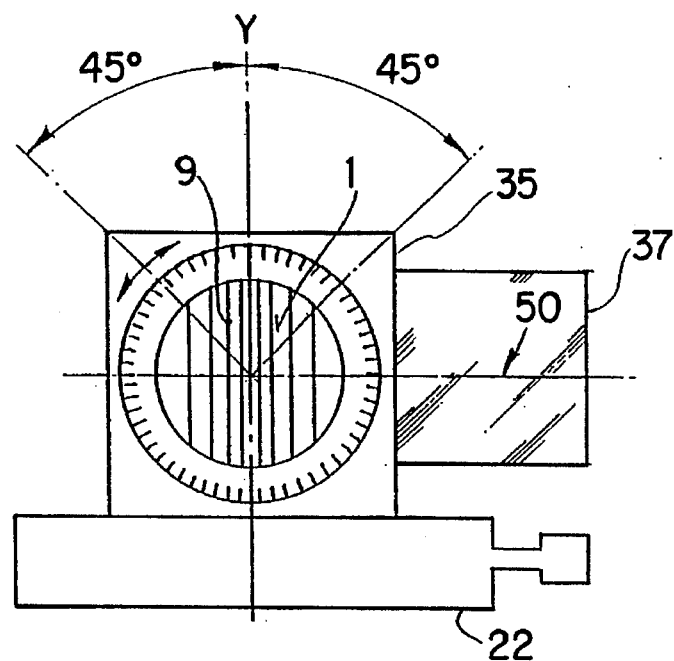
FIG. 5 is a front elevational view of an optical filter mounted on a rotation stage, according to third embodiments of the present invention.

Referring now to FIGS. 2, 4 and 5, we will describe third preferred embodiments which comprise the basic elements shown in FIGS. 2 and 4 except that the scanning means shown in FIGS. 2 and 4 is replaced by the scanning means shown in FIG. 5. The third preferred embodiments are for further characterizing the laser beam which has a cross section to which corresponds substantially an equivalent ellipse having major and minor beam widths respectively $D_{\sigma u}$ and $D_{\sigma v}$.

The first optical filter 1 is made of either a transmittance filter or of a reflectance filter. The scanning means is made of a single motorized X-translation stage 22 onto which is mounted a rotation stage 35 for rotating and positioning the first optical filter 1 in a first position where the constant lines of transmittance or reflectance of the first optical filter 1 are perpendicular to the scanning axis 50, in a second position where the lines of constant transmittance or reflectance of the filter are rotated around a center thereof by an angle of −45 degrees with respect to the first position in a plane perpendicular to the beam, and in a third position where the lines of constant transmittance or reflectance of the filter are rotated around a center thereof by an angle of +45 degrees with respect to the first position in the plane perpendicular to the beam.

The optical detector detects, in operation, light signals modified by the first optical filter 1 in the first, second and third positions, and produces respectively the first, second and third output signals accordingly.

The signal processing and detecting means have additional signal processing and detecting means to process the second and third output signals to determine respectively maximum power values $P'_{max}$ and $P''_{max}$. The apparatus further comprises second calculating means for calculating beams widths $D_{\sigma x'}$ and $D_{\sigma y'}$ by means of the following equations:

$$D_{\sigma x'} = \left\{ \frac{4W_F^2}{(M_{max} - M_{min})} \left( M_{max} - \frac{P'_{max}}{P_0} \right) \right\}^{1/2}$$

$$D_{\sigma y'} = \left\{ \frac{4W_F^2}{(M_{max} - M_{min})} \left( M_{max} - \frac{P''_{max}}{P_0} \right) \right\}^{1/2}$$

Third calculating means are also provided for calculating an angle $\theta$ between a principal axis U of the irradiance distribution of the beam and the direction X, by means of the following equation:

$\theta = (\frac{1}{2})\tan^{-1}(A)$ for $A > 0$ $\theta = (\frac{1}{2})\tan^{-1}(A) + (\pi/2)$ for $A < 0$ where:

$$A = \frac{D_{\sigma x'}^2 - D_{\sigma y'}^2}{2D_{\sigma x}^2 - (D_{\sigma x'}^2 + D_{\sigma y'}^2)}$$

Fourth calculating means are also provided for calculating the major and minor beam widths respectively $D_{\sigma u}$ and $D_{\sigma v}$ by means of the following equations:

$D_{\sigma u} = \{\cos(2\theta)D_{\sigma x}^2 + (\sin^2(\theta) + \sin(\theta)\cos(\theta))D_{\sigma x'}^2 + (\sin^2(\theta) - \sin(\theta)\cos(\theta))D_{\sigma y'}^2\}^{1/2}$ $D_{\sigma v} = \{-\cos(2\theta)D_{\sigma x}^2 + (\cos^2(\theta) - \sin(\theta)\cos(\theta))D_{\sigma x'}^2 + (\cos^2(\theta) + \sin(\theta)\cos(\theta))D_{\sigma y'}^2\}^{1/2}$.

The second, third and fourth calculating means are embodied by the data acquisition system 19.

FIG. 5 illustrates schematically the scanning means. In these third embodiments, one transmittance or reflectance optical filter 1 is employed, and the angular orientation of the lines of constant transmittance 9 in the X-Y transverse plane is allowed to change by mounting the optical filter 1 into a commercially-available rotation stage 35. The contour of the optical filter 1 has a circular shape adapted to the inner diameter of the rotation stage 35 employed. The rotation stage 35 allows for a continuous rotation of the optical filter 1 around its center position in the X-Y plane perpendicular to the optical axis Z of the apparatus. The rotation of the optical filter 1 is controlled either manually with a turning knob or electronically using a motorized rotation stage (not shown). The rotation stage 35 is mounted on a X-translation stage 22.

Three separate horizontal travels of the optical filter 1 are necessary for measuring the beam widths $D_{\sigma y}$, $D_{\sigma x'}$ and $D_{\sigma x'}$, with lines of constant transmittance or reflectance tilted at angles of −45°, 0° and +45° relative to the vertical Y axis. Obviously, a direct measurement of the beam width along any chosen arbitrary direction (except for directions close to the vertical Y direction) can be made simply from a horizontal motion of the optical filter 1 having its lines of constant transmittance or reflectance 9 oriented perpendicular to the chosen direction.

For these third preferred embodiments, if reflectance filters are used, a 100% reflecting flat mirror 37 is mounted side by side with the single reflectance filter in a same plane, for allowing the measurements of a signal $P_0$, proportional to the full power of the incident optical beam, as explained in the second preferred embodiment.

In addition, the mathematical expressions employed for calculating the beam width $D_{\sigma y}$ from the measured quantities become especially simple by setting the angles between the vertical Y axis and the lines of constant transmittance or reflectance 9 of the optical filter 1 equal to 0° and ±45°.

The method corresponding to these third preferred embodiments of the invention, for further characterizing an equivalent ellipse of the laser beam, which has major and minor beam widths respectively $D_{\sigma u}$ and $D_{\sigma v}$, take back the step of the first preferred embodiment, and further comprises the following steps:

(d) scanning a transverse direction X of a second optical filter with the laser beam to produce a second light signal modified during the scanning of step (d), the second optical filter having a profile M'(x) similar to the profile M(x) but the lines of constant transmittance or reflectance thereof are tilted by an angle of +45 degrees with respect to the direction Y;

(e) scanning a transverse direction X of a third optical filter with the laser beam to produce a third light signal modified during the scanning of step (e), the third optical filter having a profile M''(x) similar to the profile M(x) but the lines of constant transmittance or reflectance thereof are tilted by an angle of −45 degrees with respect to the direction Y;

(f) detecting the second and third light signals produced in step (d) and (e) to determine respectively maximum power values $P'_{max}$ and $P''_{max}$;

(g) calculating beam widths $D_{\sigma x'}$ and $D_{\sigma y'}$ by means of the following equations:

$$D_{\sigma x'} = \left\{ \frac{4W_F^2}{(M_{max} - M_{min})} \left( M_{max} - \frac{P'_{max}}{P_0} \right) \right\}^{1/2}$$

$$D_{\sigma y'} = \left\{ \frac{4W_F^2}{(M_{max} - M_{min})} \left( M_{max} - \frac{P''_{max}}{P_0} \right) \right\}^{1/2}$$

(h) calculating an angle $\theta$ between a principal axis U of the irradiance distribution of the beam and the direction X, by means of the following equations:

$\theta = (½)\tan^{-1}(A)$ for $A>0$ $\theta = (½)\tan^{-1}(A) + (\pi/2)$ for $A<0$ where:

$$A = \frac{D_{\sigma x'}^2 - D_{\sigma y'}^2}{2D_{\sigma x}^2 - (D_{\sigma x'}^2 + D_{\sigma y'}^2)}$$

(i) calculating the major and minor beam widths respectively $D_{\sigma u}$ and $D_{\sigma v}$ by means of the following equations:

$$D_{\sigma u} = \{\cos(2\theta)D_{\sigma x}^2 + (\sin^2(\theta) + \sin(\theta)\cos(\theta))D_{\sigma x'}^2 + (\sin^2(\theta) - \sin(\theta)\cos(\theta))D_{\sigma y'}^2\}^{1/2}$$

$$D_{\sigma v} = \{-\cos(2\theta)D_{\sigma x}^2 + (\cos^2(\theta) - \sin(\theta)\cos(\theta))D_{\sigma x'}^2 + (\cos^2(\theta) + \sin(\theta)\cos(\theta))D_{\sigma y'}^2\}^{1/2}.$$

In this method, in steps (a), (d) and (e), the first, second and third optical filters are made of a single transmittance or reflectance filter 1, and the scannings of the steps (a), (d) and (e) are performed by means of a single rotation stage 35 for rotating the optical filter around a center position thereof in a plane perpendicular to the beam.

For these third preferred embodiments, if reflectance filters are used, a 100%-reflecting flat mirror 37 is also mounted side by side with the single reflectance filter in a same plane, for allowing the measurement of a signal $P_0$, proportional to the full power of the incident optical beam, as explained in the second preferred embodiment.

Referring now to FIGS. 2, 4 and 6, we will describe fourth preferred embodiments which comprise the basic elements shown in FIGS. 2 and 4 except that the scanning means shown in FIGS. 2 and 4 is replaced by the scanning means shown in FIG. 6. The fourth preferred embodiments of the invention are for further characterizing the laser beam which has a cross section to which corresponds substantially an equivalent ellipse having major and minor beam widths $D_{\sigma u}$ and $D_{\sigma v}$. These fourth preferred embodiments further comprise a second optical filter having a profile M'(x) similar to the profile M(x) but the lines of constant transmittance or reflectance thereof are tilted by an angle of −45 degrees with respect to the direction Y; and a third optical filter having a profile M''(x) similar to the profile M(x) but the lines of constant transmittance or reflectance thereof are tilted by an angle of +45 degrees with respect to the direction Y. The first, second and third optical filters are made of either three similar transmittance filters or reflectance filters.

The scanning means is made of a motorized X-translation stage 20 having a common transversal sliding holder for holding side by side the first, second and third optical filters 1, 1A and 1B in a single plane along an axis transversal to the beam. The filters 1, 1A and 1B are mounted in the common holder 39 in such a way that the second and third filters 1A and 1B have their lines of constant transmittance or reflectance tilted respectively by angles of −45 and +45 degrees with respect to the direction Y. The common holder 39 is provided with blocking screens 5 of appropriate dimensions for separating the filters 1, 1A and 1B so that the beam cannot spread simultaneously over two adjacent filters during a motion of the common holder 39. The optical detector 15 detects, in operation, light signals modified by the first, second and third optical filters 1, 1A and 1B, and produces respectively, the first, second and third output signals accordingly.

According to these fourth embodiments, shown on FIG. 6, three independent optical filters 1, 1A and 1B having different angular orientations are used. Three similar optical filters 1, 1A and 1B are mounted side by side in the common holder 39 which is installed on the motorized X-translation stage 20. The lines of constant transmittance or reflectance 9 of the optical filters 1, 1A and 1B are separated from each other by blocking screens 5 of appropriate dimensions, so that the incident beam irradiance profile cannot spread simultaneously over two neighbouring optical filters during the horizontal travel.

Beam widths along the three angular directions specified above are measured from three successive curves $P(x_c)$ recorded by the data acquisition system 19, these curves being obtained by carrying out a single travel of the common holder 39 along the horizontal direction.

For these fourth embodiments, if reflectance filters are used, a 100%-reflecting flat mirror 41 would be installed in the common holder 39 for allowing the measurement of a signal $P_0$ proportional to the full power of the incident optical beam, as explained in the second preferred embodiment.

The method corresponding to these fourth embodiments of the present invention, comprises the steps performed for the first preferred embodiment, and further comprises:

(d) scanning a transverse direction X of a second optical filter 1A with the laser beam to produce a second light signal modified during the scanning of step (d), the second optical filter 1A having a profile M'(x) similar to the profile M(x) but the lines of constant transmittance or reflectance thereof are tilted by an angle of −45 degrees with respect to the direction Y;

(e) scanning a transverse direction X of a third optical filter 1B with the laser beam to produce a third light signal modified during the scanning of step (e), the third optical filter 1B having a profile M''(x) similar to the profile M(x) but the lines of constant transmittance or reflectance thereof are tilted by an angle of +45 degrees with respect to the direction Y;

(f) detecting the second and third light signals produced in step (d) and (e) to determine respectively maximum power values $P'_{max}$ and $P''_{max}$;

(g) calculating beam widths $D_{\sigma x'}$ and $D_{\sigma y'}$ by means of the following equations:

$$D_{\sigma x'} = \left\{ \frac{4W_F^2}{(M_{max} - M_{min})} \left( M_{max} - \frac{P'_{max}}{P_0} \right) \right\}^{1/2}$$

$$D_{\sigma y'} = \left\{ \frac{4W_F^2}{(M_{max} - M_{min})} \left( M_{max} - \frac{P''_{max}}{P_0} \right) \right\}^{1/2}$$

(h) calculating an angle θ between a principal axis U of the irradiance distribution of the beam and the direction X, by means of the following equations:

$\theta = (½)\tan^{-1}(A)$ for $A>0$ $\theta = (½)\tan^{-1}(A) + (\pi/2)$ for $A<0$ where:

$$A = \frac{D_{\sigma x'}^2 - D_{\sigma y'}^2}{2D_{\sigma x}^2 - (D_{\sigma x'}^2 + D_{\sigma y'}^2)}$$

(i) calculating the major and minor beam widths respectively $D_{\sigma u}$ and $D_{\sigma v}$ by means of the following equations:

$$D_{\sigma u} = \{\cos(2\theta)D_{\sigma x}^2 + (\sin^2(\theta) + \sin(\theta)\cos(\theta))D_{\sigma x'}^2 + (\sin^2(\theta) - \sin(\theta)\cos(\theta))D_{\sigma y'}^2\}^{1/2}$$

$$D_{\sigma v} = \{-\cos(2\theta)D_{\sigma x}^2 + (\cos^2(\theta) - \sin(\theta)\cos(\theta))D_{\sigma x'}^2 + (\cos^2(\theta) + \sin(\theta)\cos(\theta))D_{\sigma y'}^2\}^{1/2}.$$

More precisely, in the steps (a), (d) and (e), the first, second and third optical filters are made of three similar transmittance or reflectance filters, and the scannings of the steps (a), (d) and (e) are performed by means of the single motorized X-translation stage 20 having the common transversal sliding holder 39 for holding side by side the three filters 1, 1A and 1B in a single plane along an axis transversal to the beam. The filters 1, 1A and 1B are mounted in the common holder 39 in such a way that two of the filters 1A and 1B have their lines of constant transmittance or reflectance tilted respectively by angles of −45 and +45 degrees with respect to the direction Y. The common holder 39 is provided with blocking screens 5 of appropriate dimensions for separating the filters 1, 1A and 1B so that the beam cannot spread simultaneously over two adjacent filters during a motion of the common holder 39.

Also, according to these fourth preferred embodiments, if reflectance optical filters are used, the common holder 39 would also hold a 100%-reflecting flat mirror 41 mounted side by side with the three filters 1, 1A and 1B in the same single plane and along the same transversal axis to measure the full power $P_0$ of the beam.

In cases where reflectance optical filters are used, graded-reflectivity mirrors (also called GRM's), which are of considerable usefulness as output couplers in many configurations of laser resonators, are probably the most attractive components presently available for use as graded-reflectance optical filters. Graded-Reflectivity Mirrors (GRM) have a spatially-varying reflectance that can be shaped according to various profiles described by Gaussian, Super-Gaussian, parabolic, or any arbitrary function.

The most advanced technologies for fabricating high-precision GRMs are based on vacuum deposition techniques wherein thin-film coatings are deposited on a fixed anti-reflection coated substrate placed behind a properly shaped rotating mask. Although this technique results in circularly-symmetric reflectance profiles, GRMs with reflectance profiles varying along a unique direction, as required in the present invention, should be feasible by using masks that move linearly during the deposition process. The reflectance profile of GRMs fabricated according to the technique described above results from multiple-beam interferences inside the various layers deposited on the substrate. As a consequence, the exact shape of the reflectance profile depends on the wavelength of the incident light beam.

An alternative approach that can avoid this drawback would be to fabricate graded-transmittance filters from the deposition of a single absorbing layer having a spatially-varying thickness. However, the current technology for realizing high-precision absorption filters does not seem as mature as the technique described above for fabricating conventional GRMs.

Some other techniques can be potentially useful for realizing graded-transmittance optical filters. Let's mention photographic transparencies (see the U.S. Pat. No. 3,809,478 (Talbot) column 3, line 45); and liquid-crystal televisions. When inserted between two crossed polarizers, a liquid-crystal cell behaves as a spatial light modulator whose transmittance depends on an external signal voltage applied to the electrodes of the liquid-crystal cell. A liquid-crystal television consists of a two-dimensional array of small-sized liquid-crystal cells, each cell being addressed individually. Computer-generated transmittance profiles of arbitrary shape can be displayed on the liquid-crystal television, used as a transmittance device.

In the above described embodiments, all of the signal processing and detecting means, and all of the calculating means are embodied by the data acquisition system which is provided with the appropriate software.

Although the present invention has been explained hereinabove by way of preferred embodiments thereof, it should be pointed out that any modifications to these preferred embodiments, within the scope of the appended claims, are not deemed to change or alter the nature and scope of the present invention.

We claim:

1. A method for measuring a beam width $D_{\sigma x}$ along a transverse direction of a laser beam having a full power $P_0$ and a given optical irradiance distribution, the method comprising the steps of:

(a) scanning a transverse direction X of a first optical filter with the laser beam to produce a first light signal modified by the filter during the scanning, the filter having a transmittance or reflectance profile M(x) varying along the transverse direction X and characterized by lines of constant transmittance or reflectance along a transverse direction Y which is perpendicular to the direction X, the profile M(x) varying along the direction X according to a one-dimensional inverted parabola with a central maximum $M_{max}$ and two peripheral minima $M_{min}$ separated by a distance $W_F$ where a part of the laser beam falling outside the peripheral minima $M_{min}$ of the inverted parabola is substantially blocked, the profile M(x) being defined by the following equation:

$$M(x) = M_{max} - \frac{4(M_{max} - M_{min})}{W_F^2}(x - x_c)^2$$

where $M_{min}$, $M_{max}$ and $W_F$ are predetermined constants and $x_c$ is the value of x at a central position along the distance $W_F$, $W_F$ being wide enough so that a part of the laser beam which spills past boundaries determined by minima $M_{min}$ is negligible when the profile M(x) is centered on the optical irradiance distribution of the laser beam;

(b) detecting the light signal produced in step (a) to determine a maximum power value $P_{max}$; and (c) calculating the beam width $D_{\sigma x}$ by means of the following equation:

$$D_{\sigma x} = \left\{ \frac{4W_F^2}{(M_{max} - M_{min})} \left( M_{max} - \frac{P_{max}}{P_0} \right) \right\}^{1/2}.$$

2. A method according to claim 1, for further characterizing the laser beam which has a cross section to which corresponds substantially an equivalent ellipse having major and minor beam widths respectively $D_{\sigma u}$ and $D_{\sigma v}$, further comprising the steps of:

(d) scanning a transverse direction X of a second optical filter with the laser beam to produce a second light signal modified during the scanning of step (d), the second optical filter having a profile M'(x) similar to the profile M(x) but the lines of constant transmittance or reflectance thereof are tilted by an angle of −45 degrees with respect to the direction Y;

(e) scanning a transverse direction X of a third optical filter with the laser beam to produce a third light signal modified during the scanning of step (e), the third optical filter having a profile M"(x) similar to the profile M(x) but the lines of constant transmittance or reflectance thereof are tilted by an angle of +45 degrees with respect to the direction Y;

(f) detecting the second and third light signals produced in step (d) and (e) to determine respectively maximum power values $P'_{max}$ and $P''_{max}$;

(g) calculating beam widths $D_{\sigma x'}$ and $D_{\sigma y'}$ by means of the following equations:

$$D_{\sigma x'} = \left\{ \frac{4W_F^2}{(M_{max}-M_{min})} \left( M_{max} - \frac{P'_{max}}{P_0} \right) \right\}^{1/2}$$

$$D_{\sigma y'} = \left\{ \frac{4W_F^2}{(M_{max}-M_{min})} \left( M_{max} - \frac{P''_{max}}{P_0} \right) \right\}^{1/2}$$

(h) calculating an angle $\theta$ between a principal axis U of the irradiance distribution of the beam and the direction X, by means of the following equations:

$\theta = (\frac{1}{2})\tan^{-1}(A)$ for $A>0$ $\theta = (\frac{1}{2})\tan^{-1}(A) + (\pi/2)$ for $A<0$ where:

$$A = \frac{D_{\sigma x'}^2 - D_{\sigma y'}^2}{2D_{\sigma x}^2 - (D_{\sigma x'}^2 + D_{\sigma y'}^2)}$$

(i) calculating the major and minor beam widths respectively $D_{\sigma u}$ and $D_{\sigma v}$ by means of the following equations:

$D_{\sigma u} = \{\cos(2\theta)D_{\sigma x}^2 + (\sin^2(\theta)+\sin(\theta)\cos(\theta))D_{\sigma x'}^2 + (\sin^2(\theta)-\sin(\theta)\cos(\theta))D_{\sigma y'}^2\}^{1/2}$ $D_{\sigma v} = \{-\cos(2\theta)D_{\sigma x}^2 + (\cos^2(\theta)-\sin(\theta)\cos(\theta))D_{\sigma x'}^2 + (\cos^2(\theta)+\sin(\theta)\cos(\theta))D_{\sigma y'}^2\}^{1/2}$.

3. A method according to claim 1, wherein the scanning of the step (a) comprises the step of translating the first optical filter along the direction X thereof by means of a motorized X-translation stage in which the first optical filter is mounted; and wherein the step (b) of detecting comprises the steps of:

(i) converging the light signal received from the first optical filter;

(ii) attenuating by means of a neutral density filter light converged in the step (i);

(iii) photo-detecting light attenuated in the step (ii) to generate an output signal accordingly;

(iv) processing the signal generated in the step (iii) to provide an output voltage signal proportional to the output signal generated in the step (iii).

4. A method according to claim 1, wherein, in the step (a), the first optical filter is a transmittance filter.

5. A method according to claim 1, wherein, in the step (a), the first optical filter is a reflectance filter; and wherein the step (a) further comprises the step of perpendicularly reflecting the light signal reflected back from the reflectance filter.

6. A method according to claim 2, wherein:

in the steps (a), (d) and (e), the first, second and third optical filters are made of a single transmittance filter; and the scannings of the steps (a), (d) and (e) are performed by means of a single motorized X-translation stage onto which is mounted a single rotation stage for rotating the transmittance filter around a center position thereof in a plane perpendicular to the beam.

7. A method according to claim 2, wherein:

in the steps (a), (d) and (e), the first, second and third optical filters are made of a single reflectance filter; and the scannings of the steps (a), (d) and (e), are performed by means of a single motorized X-translation stage onto which is mounted a single rotation stage for rotating the reflectance filter around a center position thereof in a plane perpendicular to the beam, and onto which is mounted a 100% reflecting flat mirror mounted side by side with the single reflectance filter in a same plane to measure the full power $P_0$ of the beam.

8. A method according to claim 2, wherein:

in the steps (a), (d) and (e), the first, second and third optical filters are made of three similar transmittance filters; and the scannings of the steps (a), (d) and (e) are performed by means of a single motorized X-translation stage having a common transversal sliding holder for holding side by side the three filters in a single plane along an axis transversal to the beam, the filters being mounted in the common holder in such a way that two of the filters have their lines of constant transmittance tilted respectively by angles of −45 and +45 degrees with respect to the direction Y, the common holder being provided with blocking screens of appropriate dimensions for separating the filters so that the beam cannot spread simultaneously over two adjacent filters during a motion of the common holder.

9. A method according to claim 2, wherein:

in the steps (a), (d) and (e), the first, second and third optical filters are made of three similar reflectance filters; and the scannings of the steps (a), (d) and (e) are performed by means of a single motorized X-translation stage having a common transversal sliding holder for holding side by side the three filters in a single plane along an axis transversal to the beam, the filters being mounted in the common holder in such a way that two of the filters have their lines of constant reflectance tilted respectively by angles of −45 and +45 degrees with respect to the direction Y, the common holder being provided with blocking screens of appropriate dimensions for separating the filters so that the beam cannot spread simultaneously over two adjacent filters during a motion of the common holder, the common holder being also for holding a 100%-reflecting flat mirror mounted side by side with the three filters in the same single plane and along the same transversal axis to measure the full power $P_0$ of the beam.

10. An apparatus for measuring a beam width $D_{\sigma x}$ along a transverse direction of a laser beam having a full power $P_0$ and a given optical irradiance distribution, the apparatus comprising:

a first optical filter having a transmittance or reflectance profile M(x) varying along a transverse direction X and characterized by lines of constant transmittance or reflectance along a transverse direction Y which is perpendicular to the direction X, the profile M(x) varying along the direction X according to a one-dimensional inverted parabola with a central maximum $M_{max}$ and two peripheral minima $M_{min}$ separated by a distance $W_F$, where a part of the laser beam falling outside the peripheral minima $M_{min}$ of the inverted parabola is substantially blocked, the profile M(x) being defined by the following equation:

$$M(x) = M_{max} - \frac{4(M_{max}-M_{min})}{W_F^2}(x-x_c)^2$$

where $M_{min}$, $M_{max}$ and $W_F$ are predetermined constants and $x_c$ is the value of x at a central position along the distance $W_F$, $W_F$ being wide enough so that a part of the laser beam which spills past boundaries determined by minima $M_{min}$ is negligible when the profile $M(x)$ is centered on the optical irradiance distribution of the laser beam;

scanning means having a scanning axis for scanning the transverse direction X of the first optical filter with the laser beam;

an optical detector for detecting a light signal modified by the first optical filter, and producing a first output signal accordingly;

signal processing and detecting means for processing the output signal of the optical detector to determine a maximum power value $P_{max}$; and first calculating means for calculating the beam width $D_{\sigma x}$ by means of the following equation:

$$D_{\sigma x} = \left\{ \frac{4W_F^2}{(M_{max} - M_{min})} \left( M_{max} - \frac{P_{max}}{P_0} \right) \right\}^{1/2}.$$

11. An apparatus according to claim 10, for further characterizing the laser beam which has a cross section to which corresponds substantially an equivalent ellipse having major and minor beam widths respectively $D_{\sigma u}$ and $D_{\sigma v}$, wherein:

said first optical filter is made of a transmittance filter;

said first scanning means is made of a single motorized X-translation stage onto which is mounted a rotation stage for rotating and positioning said transmittance filter in a first position where said lines of constant transmittance of said filter are perpendicular to said scanning axis, in a second position where said lines of constant transmittance of said filter are rotated around a center thereof by an angle of −45 degrees with respect to said first position in a plane perpendicular to the beam, and in a third position where said lines of constant transmittance of said filter are rotated around a center thereof by an angle of +45 degrees with respect to said first position in said plane perpendicular to the beam, the optical detector detecting, in operation, light signals modified by the first optical filter in said first, second and third positions, and producing respectively said first output signal and second and third output signals accordingly;

the signal processing and detecting means having additional signal processing and detecting means to process the second and third output signals to determine respectively maximum power values $P'_{max}$ and $P''_{max}$; and the apparatus further comprises:

second calculating means for calculating beam widths $D_{\sigma x'}$ and $D_{\sigma y'}$ by means of the following equations:

$$D_{\sigma x'} = \left\{ \frac{4W_F^2}{(M_{max} - M_{min})} \left( M_{max} - \frac{P'_{max}}{P_0} \right) \right\}^{1/2}$$

$$D_{\sigma y'} = \left\{ \frac{4W_F^2}{(M_{max} - M_{min})} \left( M_{max} - \frac{P''_{max}}{P_0} \right) \right\}^{1/2}$$

third calculating means for calculating an angle θ between a principal axis U of the irradiance distribution of the beam and the direction X, by means of the following equation:

$\theta = (\tfrac{1}{2})\tan^{-1}(A)$   for A>0

$\theta = (\tfrac{1}{2})\tan^{-1}(A)+(\pi/2)$   for A<0 where:

$$A = \frac{D_{\sigma x'}^2 - D_{\sigma y'}^2}{2D_{\sigma x}^2 - (D_{\sigma x'}^2 + D_{\sigma y'}^2)}$$

fourth calculating means for calculating the major and minor beam widths respectively $D_{\sigma u}$ and $D_{\sigma v}$ by means of the following equations:

$D_{\sigma u} = \{\cos(2\theta)D_{\sigma x}^2 + (\sin^2(\theta) + \sin(\theta)\cos(\theta))D_{\sigma x'}^2 + (\sin^2(\theta) - \sin(\theta)\cos(\theta))D_{\sigma y'}^2\}^{1/2}$ $D_{\sigma v} = \{-\cos(2\theta)D_{\sigma x}^2 + (\cos^2(\theta) - \sin(\theta)\cos(\theta))D_{\sigma x'}^2 + (\cos^2(\theta) + \sin(\theta)\cos(\theta))D_{\sigma y'}^2\}^{1/2}.$ 12. An apparatus according to claim 10, for further characterizing the laser beam which has a cross section to which corresponds substantially an equivalent ellipse having major and minor beam widths respectively $D_{\sigma u}$ and $D_{\sigma v}$, wherein:

said first optical filter is made of a single reflectance filter;

said scanning means is made of a single motorized X-translation stage onto which is mounted a rotation stage for rotating and positioning the reflectance filter in a first position where said lines of constant reflectance of said filter are perpendicular to said scanning axis, in a second position where said lines of constant reflectance of said filter are rotated around a center position thereof by an angle of −45 degrees with respect to said first position in a plane perpendicular to the beam, and in a third position where said lines of constant reflectance of said filter are rotated around a center thereof by an angle of +45 degrees with respect to said first position in said plane perpendicular to the beam, and a 100% reflecting flat mirror mounted side by side with the single reflectance filter in a same plane to measure the full power $P_0$ of the beam, the optical detector detecting, in operation, light signals modified by the first optical filter in said first, second and third positions and producing respectively said first output signal, and second and third output signals accordingly;

the signal processing and detecting means having additional signal processing and detecting means to process the second and third output signals to determine respectively maximum power values $P'_{max}$ and $P''_{max}$; and the apparatus further comprising:

second calculating means for calculating beam widths $D_{\sigma x'}$ and $D_{\sigma y'}$ by means of the following equations:

$$D_{\sigma x'} = \left\{ \frac{4W_F^2}{(M_{max} - M_{min})} \left( M_{max} - \frac{P'_{max}}{P_0} \right) \right\}^{1/2}$$

$$D_{\sigma y'} = \left\{ \frac{4W_F^2}{(M_{max} - M_{min})} \left( M_{max} - \frac{P''_{max}}{P_0} \right) \right\}^{1/2}$$

third calculating means for calculating an angle θ between a principal axis U of the irradiance distribution of the beam and the direction X, by means of the following equation:

$\theta = (\tfrac{1}{2})\tan^{-1}(A)$   for A>0

$\theta = (\tfrac{1}{2})\tan^{-1}(A)+(\pi/2)$   for A<0 where:

$$A = \frac{D_{\sigma x'}^2 - D_{\sigma y'}^2}{2D_{\sigma x'}^2 - (D_{\sigma x'}^2 + D_{\sigma y'}^2)}$$

fourth calculating means for calculating the major and minor beam widths respectively $D_{\sigma u}$ and $D_{\sigma v}$ by means of the following equations:

$$D_{\sigma u} = \{\cos(2\theta)D_{\sigma x'}^2 + (\sin^2(\theta) + \sin(\theta)\cos(\theta))D_{\sigma x}^2 + (\sin^2(\theta) - \sin(\theta)\cos(\theta))D_{\sigma y}^2\}^{1/2}$$

$$D_{\sigma v} = \{-\cos(2\theta)D_{\sigma x'}^2 + (\cos^2(\theta) - \sin(\theta)\cos(\theta))D_{\sigma x}^2 + (\cos^2(\theta) + \sin(\theta)\cos(\theta))D_{\sigma y}^2\}^{1/2}$$

13. An apparatus according to claim 10, for further characterizing the laser beam which has a cross section to which corresponds substantially an equivalent ellipse having major and minor beam widths respectively $D_{\sigma u}$ and $D_{\sigma v}$, wherein:

a second optical filter having a profile M'(x) similar to the profile M(x) but lines of constant transmittance thereof are tilted by an angle of −45 degrees with respect to the direction Y;

a third optical filter having a profile M''(x) similar to the profile M(x) but lines of constant transmittance thereof are tilted by an angle of +45 degrees with respect to the direction Y, said first, second and third optical filters being made of three similar transmittance filters; and wherein:

the scanning means is made of a motorized X-translation stage having a common transversal sliding holder for holding side by side the first, second and third optical filters in a single plane along an axis transversal to the beam, the filters being mounted in the common holder in such a way that the second and third filters have their lines of constant transmittance tilted respectively by angles of −45 and +45 degrees with respect to the direction Y, the common holder being provided with blocking screens of appropriate dimensions for separating the filters so that the beam cannot spread simultaneously over two adjacent filters during a motion of the common holder, the optical detector detecting, in operation, light signals modified by the first, second and third optical filters, and producing respectively said first output signal and second and third output signals accordingly;

the signal processing and detecting means having additional signal processing and detecting means to process the second and third output signals to determine respectively maximum power values $P'_{max}$ and $P''_{max}$; and the apparatus also further comprises:

second calculating means for calculating beam widths $D_{\sigma x'}$ and $D_{\sigma y'}$ by means of the following equations:

$$D_{\sigma x'} = \left\{ \frac{4W_F^2}{(M_{max} - M_{min})} \left( M_{max} - \frac{P'_{max}}{P_0} \right) \right\}^{1/2}$$

$$D_{\sigma y'} = \left\{ \frac{4W_F^2}{(M_{max} - M_{min})} \left( M_{max} - \frac{P''_{max}}{P_0} \right) \right\}^{1/2}$$

third calculating means for calculating an angle $\theta$ between a principal axis U of the irradiance distribution of the beam and the direction X, by means of the following equation:

$$\theta = (\tfrac{1}{2})\tan^{-1}(A) \quad \text{for } A > 0$$

$$\theta = (\tfrac{1}{2})\tan^{-1}(A) + (\pi/2) \quad \text{for } A < 0$$

where:

$$A = \frac{D_{\sigma x'}^2 - D_{\sigma y'}^2}{2D_{\sigma x'}^2 - (D_{\sigma x'}^2 + D_{\sigma y'}^2)}$$

fourth calculating means for calculating the major and minor beam widths respectively $D_{\sigma u}$ and $D_{\sigma v}$ by means of the following equations:

$$D_{\sigma u} = \{\cos(2\theta)D_{\sigma x'}^2 + (\sin^2(\theta) + \sin(\theta)\cos(\theta))D_{\sigma x}^2 + (\sin^2(\theta) - \sin(\theta)\cos(\theta))D_{\sigma y}^2\}^{1/2}$$

$$D_{\sigma v} = \{-\cos(2\theta)D_{\sigma x'}^2 + (\cos^2(\theta) - \sin(\theta)\cos(\theta))D_{\sigma x}^2 + (\cos^2(\theta) + \sin(\theta)\cos(\theta))D_{\sigma y}^2\}^{1/2}$$

14. An apparatus according to claim 10, for further characterizing the laser beam which has a cross section to which corresponds substantially an equivalent ellipse having major and minor beam widths respectively $D_{\sigma u}$ and $D_{\sigma v}$, further comprising:

a second optical filter having a profile M'(x) similar to the profile M(x) but the lines of constant reflectance thereof are tilted by an angle of −45 degrees with respect to the direction Y;

a third optical filter having a profile M''(x) similar to the profile M(x) but the lines of constant reflectance thereof are tilted by an angle of +45 degrees with respect to the direction Y, said first, second and third optical filters are made of three similar reflectance filters; and wherein:

the scanning means is made of a single motorized X-translation stage having a common transversal sliding holder for holding side by side the first, second and third filters in a single plane along an axis transversal to the beam, the filters being mounted in the common holder in such a way that the second and third filters have their lines of constant reflectance tilted respectively by angles of −45 and +45 degrees with respect to the direction Y, the common holder being provided with blocking screens of appropriate dimensions for separating the filters so that the beam cannot spread simultaneously over two adjacent filters during a motion of the common holder, the common holder being also for holding a 100%-reflecting flat mirror mounted side by side with the first, second and third filters in the same single plane and along the same transversal axis to measure the full power $P_0$ of the beam, the optical detector detecting, in operation, light signals modified by the first, second and third optical filters, and producing respectively said first output signal, and second and third output signals accordingly;

the signal processing and detecting means having additional signal processing and detecting means to process the second and third output signals to determine respectively maximum power values $P'_{max}$ and $P''_{max}$; and the apparatus further comprises:

second calculating means for calculating beam widths $D_{\sigma x'}$ and $D_{\sigma y'}$ by means of the following equations:

$$D_{\sigma x'} = \left\{ \frac{4W_F^2}{(M_{max} - M_{min})} \left( M_{max} - \frac{P'_{max}}{P_0} \right) \right\}^{1/2}$$

$$D_{\sigma y'} = \left\{ \frac{4W_F^2}{(M_{max} - M_{min})} \left( M_{max} - \frac{P''_{max}}{P_0} \right) \right\}^{1/2}$$

third calculating means for calculating an angle $\theta$ between a principal axis U of the irradiance distribution of the beam and the direction X, by means of the following equation:

$$\theta = (\tfrac{1}{2})\tan^{-1}(A) \quad \text{for } A>0$$

$$\theta = (\tfrac{1}{2})\tan^{-1}(A)+(\pi/2) \quad \text{for } A<0$$

where:

$$A = \frac{D_{ox'}^2 - D_{oy'}^2}{2D_{ox}^2 - (D_{ox'}^2 + D_{oy'}^2)}$$

fourth calculating means for calculating the major and minor beam widths respectively $D_{ou}$ and $D_{ov}$ by means of the following equations:

$$D_{ou} = \{\cos(2\theta)D_{ox}^2 + (\sin^2(\theta)+\sin(\theta)\cos(\theta))D_{ox'}^2 + (\sin^2(\theta)-\sin(\theta)\cos(\theta))D_{oy'}^2\}^{1/2}$$

$$D_{ov} = \{-\cos(2\theta)D_{ox}^2 + (\cos^2(\theta)-\sin(\theta)\cos(\theta))D_{ox'}^2 + (\cos^2(\theta)+\sin(\theta)\cos(\theta))D_{oy'}^2\}^{1/2}.$$

15. An apparatus according to claim 10, wherein the first scanning means comprise a motorized X-translation stage in which, in operation, the first optical filter is mounted, and a motion controller for controlling operation of the motorized X-translation stage.

16. An apparatus according to claim 15, wherein the optical detector comprises a converging lens for receiving the light signal from the first optical filter, a neutral density filter for receiving light from the converging lens, a photo-detector for receiving light from the neutral density filter and a milliammeter for receiving an output signal from the photo-detector and providing an output voltage signal proportional to the output signal of the photo-detector.

17. An apparatus according to claim 16, wherein the signal processing and detecting means and the first calculating means are provided by a data acquisition system which has a first input for receiving an output signal from the milliammeter and a second input for receiving an output signal from the motion controller, which is indicative of a horizontal movement of the X-translation stage.

18. An apparatus according to claim 17, wherein the first optical filter is a transmittance filter.

19. An apparatus according to claim 17, wherein the first optical filter is a reflectance filter, the apparatus further comprises a high quality beamsplitter for receiving the first light signal which is reflected back from the reflectance filter and for reflecting the first light signal towards the converging lens.

* * * * *